(12) United States Patent
Song et al.

(10) Patent No.: US 10,489,489 B2
(45) Date of Patent: Nov. 26, 2019

(54) AUTOMATICALLY CLASSIFYING AND PRESENTING DIGITAL FONTS

(71) Applicant: Adobe Inc., San Jose, CA (US)

(72) Inventors: Yuyan Song, Milpitas, CA (US); Seth Shaw, San Francisco, CA (US); Aaron Hertzmann, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 292 days.

(21) Appl. No.: 15/065,501

(22) Filed: Mar. 9, 2016

(65) Prior Publication Data

US 2017/0262413 A1 Sep. 14, 2017

(51) Int. Cl.
| | | |
|---|---|---|
| *G06F 17/24* | (2006.01) | |
| *G06F 17/21* | (2006.01) | |
| *G06F 3/0484* | (2013.01) | |
| *G06F 3/0482* | (2013.01) | |
| *G06N 20/00* | (2019.01) | |
| *G06F 16/332* | (2019.01) | |

(52) U.S. Cl.
CPC .......... *G06F 17/214* (2013.01); *G06F 3/0482* (2013.01); *G06F 3/04842* (2013.01); *G06F 16/332* (2019.01); *G06F 17/24* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,512,531 B1* | 1/2003 | Gartland | ............... | G06F 3/0481 345/467 |
| 2006/0132812 A1* | 6/2006 | Barnes | .................. | G06F 17/212 358/1.11 |
| 2008/0303822 A1* | 12/2008 | Taylor | ................... | G06F 17/214 345/467 |
| 2008/0306916 A1* | 12/2008 | Gonzalez | .............. | G06F 17/214 |
| 2010/0275161 A1* | 10/2010 | DiCamillo | ............ | G06F 17/211 715/810 |
| 2015/0097842 A1* | 4/2015 | Kaasila | ................ | G06K 9/6215 345/471 |
| 2015/0100882 A1* | 4/2015 | Severenuk | ............ | G06F 17/214 715/269 |
| 2016/0078656 A1* | 3/2016 | Borson | ................. | G06F 17/214 345/472 |
| 2016/0300178 A1* | 10/2016 | Perry | ............. | G06Q 10/063112 |
| 2016/0307347 A1* | 10/2016 | Matteson | .............. | G06F 17/214 |
| 2017/0255597 A1* | 9/2017 | Sinn | ....................... | G06F 17/214 |

* cited by examiner

*Primary Examiner* — Sanchita Roy

(74) *Attorney, Agent, or Firm* — Keller Jolley Preece

(57) ABSTRACT

Systems and methods are disclosed for classifying digital fonts. In particular, in one or more embodiments, the disclosed systems and methods detect a new digital font, automatically classify the digital font into one or more font classifications, and make the digital font available via a user interface. More particularly, the disclosed systems and methods can conduct searches for the new digital font, identify digital fonts similar to the new digital font, and apply the new digital font to digital text in an electronic document.

20 Claims, 18 Drawing Sheets

New Digital Font 430

Trained Machine Learning Algorithm
422

432 { 
Class 436          Decorative
Weight 438          Heavy
Width 440          Regular
X-Height 442          Large
Contrast 444          High
Attribute 446          Playful

AUTOMATICALLY CLASSIFYING AND PRESENTING DIGITAL FONTS

BACKGROUND

1. Technical Field

The present disclosure relates generally to classifying digital fonts. More specifically, one or more embodiments of the present disclosure relate to systems and methods that automatically classify digital fonts into one or more font classifications and utilize the font classifications to present the digital fonts for display.

2. Background and Relevant Art

Recent years have seen a rapid proliferation in the use of computing devices in creating and editing electronic documents. Indeed, it is now common place for individuals and businesses to create digital marketing materials, digital magazines, webpages, e-mails, and other electronic documents utilizing desktop computers, laptop computers, mobile devices, tablets, smartphones, or other computing devices.

With the increasing utilization of computing devices to generate electronic documents, conventional digital publishing systems have responded by providing users with a variety of creative digital publishing options. For example, many digital publishing systems have increased the number of digital fonts. Indeed, some conventional digital publishing systems now provide thousands of digital fonts for utilization in generating and editing digital text in electronic documents.

Although the increased number of digital fonts provides additional opportunities for creative expression, the number of digital fonts introduces a number of problems. For example, because of the vast number of digital fonts, it is often time-consuming and difficult to search for and identify a digital font. Indeed, finding a digital font that is suitable for a particular design often involves reviewing digital fonts one-by-one until a desired font is found. Accordingly, the process of locating fonts in conventional digital systems is often tedious and frustrating.

The difficulty of identifying and utilizing digital fonts is only exacerbated in circumstances where a user seeks to utilize a new digital font. In order to utilize a new digital font, conventional digital systems often require a user to engage in a number of time-consuming steps to identify the new digital font; import the new digital font; apply labels, tags, or other identifying information to the new digital font; and organize the new digital font according to the particular labels, tags, or other identifying information. Thereafter, conventional digital publishing systems provide the new digital font in a list of hundreds or thousands of additional digital fonts. Accordingly, in order to utilize the new digital font, a user must search the list of hundreds or thousands of digital fonts to identify and select the new digital font.

These and other problems exist with regard to classifying and presenting digital fonts using conventional systems and methods.

BRIEF SUMMARY

Embodiments of the present disclosure provide benefits and/or solve one or more of the foregoing or other problems in the art with systems and methods that automatically and intelligently classify digital fonts. Additionally, the systems and methods include user interfaces and workflows that efficiently surface classified fonts for use. In particular, one or more embodiments of the disclosed systems and methods detect a new digital font on a computing device. The disclosed systems and methods automatically classify the new digital font. Moreover, in one or more embodiments, the systems and methods generate a user interface that enables a user to search for and identify the new digital font. Furthermore, the systems and methods can identify fonts similar to the new digital font and provide the fonts similar to the new digital font for display via the user interface.

For example, in one or more embodiments, the systems and methods detect a new digital font on a computing device upon launching an electronic document application on the computing device. In response to detecting the new digital font on the computing device, the systems and methods determine a font classification for the new digital font based on font features of the new digital font. Moreover, the systems and methods receive a search query (e.g., a search query comprising the font classification) via a user interface of the electronic document application. The systems and methods then render a visual representation of the new digital font for selection and application to digital text within the user interface of the electronic document application.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1A:
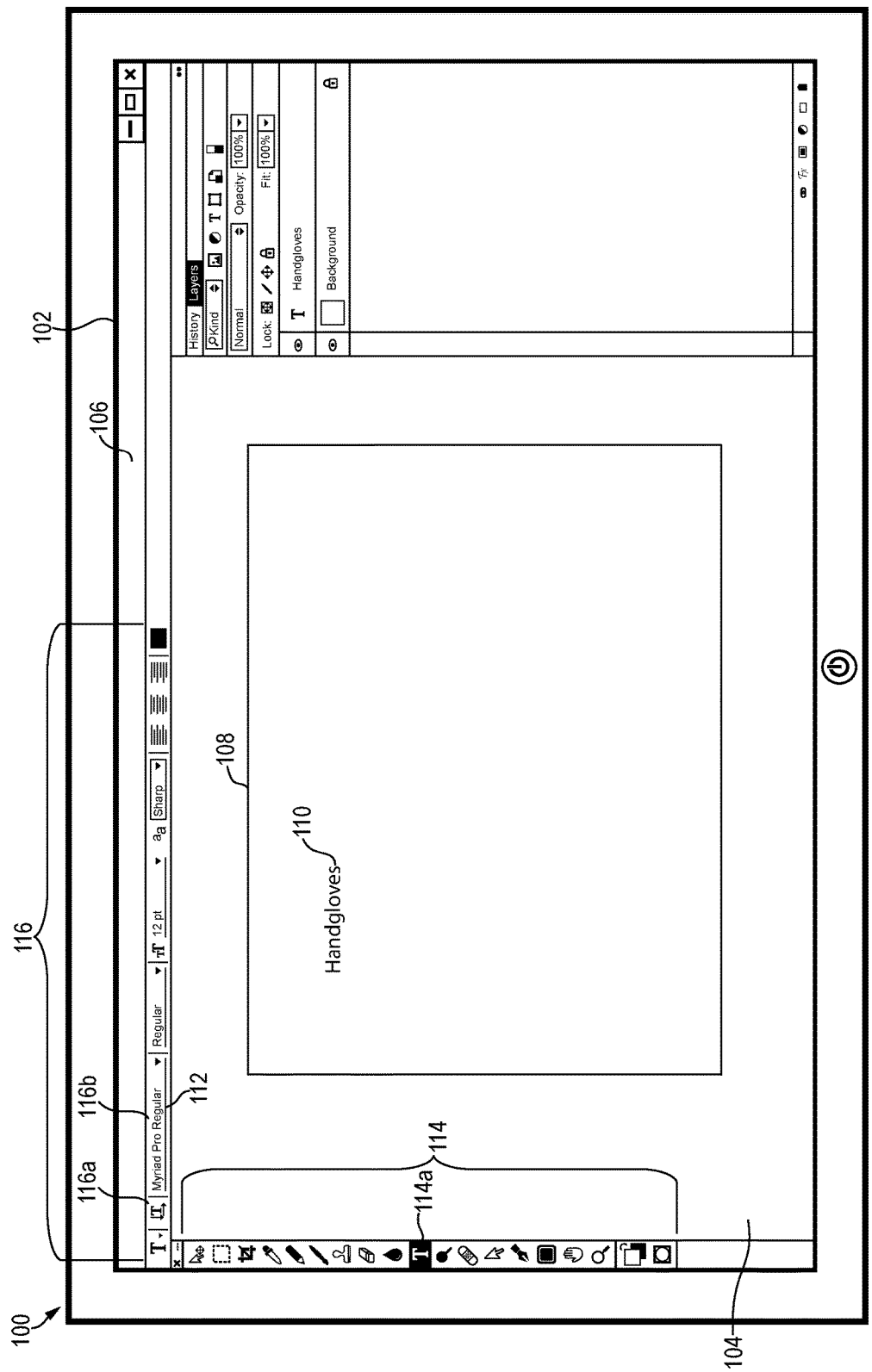
FIG. 1A illustrates a user interface for creating and editing electronic documents with digital text in accordance with one or more embodiments.

One or more embodiments of the present disclosure include a digital font classification system that automatically classifies digital fonts. In particular, in one or more embodiments, the digital font classification system detects a new digital font on a computing device and automatically identifies font classifications corresponding to the new digital font. Moreover, upon identifying font classifications, the digital font classification system can search for, identify, and provide the new digital font for selection and use. For instance, the digital font classification system searches for and identifies the new digital font using various search query parameters. In addition, the digital font classification system searches for and identifies digital fonts similar to the new digital font.

For example, in one or more embodiments, the digital font classification system detects a new digital font on a computing device upon running or launching an electronic document application. In response to detecting the new digital font on the computing device, the digital font classification system determines a font classification corresponding to the new digital font based on font features of the new digital font. Moreover, the digital font classification system receives a search query comprising the font classification, and renders a visual representation of the new digital font for selection and application to digital text.

By detecting a new digital font, identifying font classifications corresponding to the new digital font, and searching based on font classifications, the digital font classification system significantly reduces the amount of time and effort required to identify and utilize digital fonts. For example, upon running an electronic document application, the digital font classification system automatically (i.e., without user interaction) classifies a new digital font and reflects the classification through a user interface. The digital font classification system classifies new digital fonts and makes them available through the user interface without requiring the user to select the new digital font (e.g., select the new digital font for import into an electronic document application) or identify the font classifications corresponding to the new digital font (e.g., tag or label the new digital font).

As described in greater detail below, the digital font classification system provides a variety of user interface elements/controls for quickly and efficiently identifying and selecting digital fonts. In particular, the digital font classification system provides a user interface that enables a user to filter digital fonts based on font characteristics. For example, the digital font classification system determines that a new digital font belongs to a particular font class (e.g., Sans Serif) and conducts a search for digital fonts belonging to the particular font class (e.g., Sans Serif). The digital font classification system provides the resulting digital fonts matching the font class for display.

Similarly, in one or more embodiments, the digital font classification system provides a similar digital font filter option or control. Upon user interaction with the similar digital font filter control, the digital font classification system identifies similar digital fonts (e.g., digital fonts similar to a new digital font). Moreover, the digital font classification system displays the identified similar digital fonts or selection by a user. In this manner, the user can identify and select similar fonts from a database of thousands of fonts efficiently and quickly.

Furthermore, in one or more embodiments, the digital font classification system provides an attribute selectable menu option. For example, the digital font classification system provides an attribute selectable menu option that includes descriptive terms (e.g., playful, professional). In response to user interaction with the attribute selectable menu option, the digital font classification system identifies digital fonts corresponding to a selected attribute (e.g., identifies playful fonts) and provides the identified digital fonts for selection by a user.

As mentioned previously, the digital font classification system determines one or more font classifications corresponding to a digital font. Specifically, in one or more embodiments, the digital font classification system utilizes a machine learning algorithm to determine font classifications of a font. In particular, the digital font classification system trains a machine learning model utilizing a plurality of training digital fonts and training font classifications. Upon training the machine learning model, the digital font classification system utilizes the trained machine learning model to classify a new digital font. For example, the digital font classification system provides the new digital font as an input to the trained machine learning model, which outputs font classifications corresponding to the new digital font.

In one or more embodiments, the digital font classification system utilizes a trained machine learning model to generate a font feature database. In particular, the digital font classification system generates a font feature database that associates a plurality of font features to corresponding font classifications. The digital font classification determines font features and utilizes the determined font features in conjunction with the font feature database to classify fonts.

The digital font classification system determines one or more font classifications corresponding to a digital font. For example, the digital font classification system determines a font class (e.g., Serif, Sans Serif, Slab Serif, Script, Blackletter, Mono, Hand, or Decorative). Similarly, in one or more embodiments, the digital font classification system determines a font classification comprising a weight, a width, an x-height, a contrast, or a capitalization style.

In addition, the digital font classification system determines font attributes. As used herein, the term "font attribute" refers to a descriptive term corresponding to a digital font. In particular, the term "font attribute" includes a term (e.g., an adjective) describing a style, emotion, feeling, or impression corresponding to a digital font. For example, font attributes can include the terms angular, artistic, attention-grabbing, attractive, bad, boring, calm, capitals, charming, clumsy, complex, cursive, delicate, disorderly, display, dramatic, formal, fresh, friendly, gentle, graceful, happy, italic, legible, modern, monospace, playful, pretentious, sharp, sloppy, soft, strong, technical, thin, warm, or wide.

In addition to determining font classifications (e.g., font attributes), the digital font classification system also conducts searches based on font classifications. In particular, the digital font classification system filters a plurality of digital fonts based on a search parameter comprising a font characteristic. For example, the digital font classification system can receive a search query (e.g., Slab Serif digital fonts with large contrast) and apply the search query to a plurality of digital fonts (e.g., a digital font lookup table/digital font database associating digital fonts with corresponding font characteristics). The digital font classification system compares the search query to font classifications of the plurality of digital fonts (e.g., compare the search query to the lookup table) to identify digital fonts that correspond to the search query. The digital font classification system then surfaces the identified digital fonts via a user interface for selection by a user.

Similarly, the digital font classification system conducts searches utilizing font attributes. For instance, the digital font classification system determines that a new digital font corresponds to a "playful" font attribute. The digital font classification system can receive a search query for "playful" digital fonts and, in response, provide the new digital font and other "playful" digital fonts for display.

As mentioned previously, the digital font classification system also identifies and surfaces similar digital fonts. For example, in one or more embodiments, the digital font classification system compares features of a new digital font with other digital fonts to identify similar digital fonts. More specifically, in one or more embodiments, the digital font classifications system utilizes a machine learning algorithm to generate feature vectors corresponding to a new digital font and other digital fonts. The digital font classification system compares the feature vectors and, based on the comparison, identifies similar digital fonts.

Additional detail will now be provided regarding the digital font classification system in relation to illustrative figures portraying exemplary embodiments of the digital font classification system. In particular, FIGS. 1A-4B illustrate computing devices displaying user interfaces for classifying, selecting, and/or utilizing digital fonts in relation to electronic documents in accordance with one or more embodiments of the digital font classification system.

It will be appreciated that the digital font classification system can be implemented in a variety of environments and utilizing a variety of components. For example, in relation to FIGS. 1A-4B, the digital font classification system is implemented both as part of a computing device displaying a user interface and as part of a remote server in connection with the computing device via a digital network (e.g., the Internet). In particular, the digital font classification system is implemented as an application installed on a local computing device and as a web-based application hosted on a remote server, and accessible via the Internet. Accordingly, as described in greater detail below, with regard to the embodiments of FIGS. 1A-4B, the digital font classification system can utilize a local computing device and/or one or more remote servers to classify, search, identify, provide, send, or receive digital fonts.

It will be appreciated that other implementations of the digital font classification system are also contemplated by the present disclosure. For example, in relations to FIGS. 1A-4B, the digital font classification system may be implemented as one or more operating systems, as one or more stand-alone applications, as one or more modules of an application, as one or more plug-ins, as one or more library functions or functions that may be called by other applications, and/or as a cloud-computing model. Thus, the digital font classification system may be implemented as a stand-alone application, such as a desktop or mobile application. Furthermore, the digital font classification system may be implemented as one or more web-based applications hosted on a remote server. Alternatively or additionally, the digital font classification system may be implemented in a suit of mobile device applications or "apps." Additional detail regarding exemplary components and environments implementing the digital font classification system are provided below with regard to FIGS. 6 and 7.

Turning now to FIGS. 1A-1E, additional detail is provided regarding a user interface for presenting digital fonts in accordance with one or more embodiments. For example, FIGS. 1A-1E illustrate how the digital font classification system can detect, classify, and incorporate new digital fonts into a user interface without requiring user interaction or user input. In particular, FIG. 1A illustrates a computing device 100 with a screen 102 displaying a user interface 104 corresponding to an electronic document application 106 running on the computing device 100. Specifically, the user interface 104 displays an electronic document 108 with digital text 110 having a digital font 112.

Moreover, the user interface 104 also displays a plurality of electronic document editing elements or controls in a tool pallet 114, including the text editing element 114a. As shown, the text editing element 114a is selected; accordingly, the user interface 104 displays a plurality of text modification elements or options 116a-116b in the digital font control panel 116. For example, the text rotation element 116a in the digital font control panel 116 enables rotation of text (e.g., from horizontal text to vertical text or vice versa). Similarly, the digital font modification element 116b of the digital font control panel 116 enables searching, filtering, identifying, selecting, and applying of digital fonts.

The electronic document application 106 providing the user interface 104 can comprise an application that creates or modifies an electronic document. For example, in one or more embodiments, the electronic document application 106 comprises ADOBE® PHOTOSHOP®. In another example, the electronic document application comprises ADOBE® ILLUSTRATOR®.

As used herein, the term "electronic document" refers to an electronic file that includes a digital font. For example, an electronic document can include electronic files in the form of a word processing document, a .pdf file, an image file, an e-mail file, a text file, a web page, or any other electronic file. An electronic document can comprise an electronic advertisement, brochure, flyer, or other digital marketing material. Similarly, an electronic document can comprise an electronic book, magazine, periodical, or other digital publication. Thus, as shown in FIG. 1A, the electronic document 108 comprises a digital advertisement.

As used herein, the term "digital font" refers to a defined set of digital characters. In particular, the term "digital font" includes a collection of digital characters of a particular style or typeface. A digital font includes digital files with the extensions, such as, but not limited to: .ttf, .otf, .fnt, .abf, .ttc, .suit, .woff, .vnf, .t65, .sfp, .sfd, .pmt, .pfm, .pfb, .pfa, .odtff, .mf, .gdr, .fon, .fnt, .etx, .eot, .compositefont, .acfm, .afm, or .amfm. For example, the term digital font includes digital fonts entitled Times New Roman, Helvetica, Arial, Adobe Clean Light, PT Sans Regular, Karmina, or other digital font titles included herein. For example, the term digital font includes the digital font 112 (i.e., Myriad Pro Regular) applied to the digital text 110 of FIG. 1A.

As mentioned previously, in one or more embodiments, the digital font classification system detects a new digital font. In particular, in relation to FIG. 1A, the digital font classification system searches for new digital fonts. Specifically, in response to executing the electronic document application 106, the digital font classification system begins to search the computing device 100 or other devices (e.g., one or more remote servers) for new digital fonts (i.e., fonts that have not previously been classified).

A new digital font can be generated, created, stored, installed, registered, received, downloaded, or placed on the computing device 100 in a variety of ways. For example, in one or more embodiments, a user of the computing device 100 creates the new digital font (e.g., utilizes software to generate a new digital font). Similarly, a user of the computing device 100 can install the new digital font from a remote server (e.g., download a new digital font from a third party). Moreover, a user of the computing device 100 can modify an existing digital font to generate a new digital font (e.g., utilize software to adjust the glyph style of a first digital font to create a second digital font).

The digital font classification system searches for and identifies a new digital font stored on a computing device. For example, the digital font classification system searches a repository of digital fonts on the computing device 100 (e.g., a font file folder or registry) for new digital fonts that have not previously been classified.

The digital font classification system searches files associated with other software applications (e.g., third party software applications) to identify a new digital font. For example, the digital font classification system searches storage files corresponding to software capable of creating, modifying, or downloading digital fonts to identify new digital fonts (e.g., third-party font creation software). For instance, the computing device 100 can utilize a first software application to modify or generate a digital font, and the digital font classification system can automatically detect the new digital font, classify the new digital font, and make the new digital font available in the electronic document application 106.

By detecting (e.g., synchronizing) new digital fonts across applications in this manner, the digital font classification system can reduce the amount of time and effort required for a user to utilize new digital fonts. Specifically, by automatically synchronizing new digital fonts, the digital font classification system avoids a variety of time-consuming steps required in conventional systems. For example, the digital font classification system avoids the need for a user to manually search for and locate digital font files, import digital fonts, tag digital font files, and otherwise manually manipulate the digital fonts for utilization in the electronic document application 106.

In addition to searching the computing device 100, the digital font classification system can also search for new digital fonts stored remotely from the computing device 100. For instance, the computing device 100 may have access to data stored on a remote server, such as a cloud-based storage system. The digital font classification system gains access to the remote server (utilizing access credentials or login information on the computing device 100) and searches the remote server for new digital fonts. Alternatively, the digital font classification system receives metadata about digital fonts. The digital font classification system can classify the digital fonts based on the metadata and surface information (such as a preview) of digital fonts on the remote server via the user interface. Then upon selection of a preview of a digital font on a remote server, the digital font classification system can download the selected digital font to the computing device 100 for use with the electronic document application 106.

Similarly, as described above, in one or more embodiments, all or part of the digital font classification system is implemented as part of a remote server (e.g., as software hosted on a web server accessed via a web browser by the computing device 100). In such circumstances, the remote server implementing the digital font classification system can also provide cloud-based storage services for data corresponding to the electronic document application 106. The digital font classification system can search the cloud-based storage service corresponding to the computing device 100 (e.g., corresponding to an account associated with the computing device 100 or a user of the computing device 100) for any new digital fonts.

The digital font classification system searches for and identifies new digital fonts at a variety of times. For instance, in one or more embodiments, upon execution/launching of the electronic document application 106, the digital font classification system automatically searches for any new digital fonts. Similarly, in one or more embodiments, the digital font classification system automatically searches for new digital fonts upon detecting entry of text into the electronic document 108. Furthermore, in one or more embodiments, the digital font classification system searches for new digital fonts upon selection of the text editing element 114a or the digital font modification element 116b.

With regard to the embodiment of FIG. 1A, the digital font classification system automatically runs one or more background programs or scripts to identify and classify any new digital fonts upon launching of the electronic document application 106. In this manner, the digital font classification system reduces or eliminates the amount of time a user must wait before new digital fonts are identified, classified, and available for use via the electronic document application 106.

Thus, in relation to FIG. 1A, the digital font classification system utilizes one or more background programs or scripts to detect new digital fonts upon determining that the computing device 100 is running the electronic document application 106. In particular, the one or more background programs or scripts detect new digital fonts by accessing a digital font database (e.g., digital font lookup table) that includes previously identified (e.g., classified) digital fonts and comparing digital fonts on the computing device 100 with the digital font database.

More specifically, in one or more embodiments, the digital font classification system manages a digital font database that associates a plurality of digital fonts with corresponding font classifications. The digital font database includes data (e.g., title and font classifications) regarding any previously classified digital fonts. The digital font classification system can search for new digital fonts utilizing the digital font database. For example, the digital font classification system utilizes one or more background programs or scripts to identify digital fonts stored on a computing device 100. The digital font classification system compares the identified digital fonts stored on the computing device 100 with the digital font database (e.g., compare the title and/or font classifications of the identified digital fonts with the title and/or font classifications in the digital font database). Based on the comparison (i.e., of an identified digital font is not included in the digital font database), the digital font classification system can identify new digital fonts on the computing device 100.

Upon identifying a new digital font, the digital font classification system automatically classifies the new digital font. As described in greater detail below in relation to FIGS. 4A-4B, the digital font classification system can classify a new digital font utilizing machine learning technologies. In particular, in one or more embodiments, the digital font classification system can provide a new digital font as input to a trained machine learning model and determine font classifications corresponding to the new digital font.

Similarly, in one or more embodiments, the digital font classification system utilizes a font feature database (i.e., a font feature database created utilizing a trained machine learning algorithm) to classify new digital fonts. As used herein, the term "font feature" refers to a measurable characteristic of a digital font. In particular, the term "font feature" includes a set of numeric metrics corresponding to characteristics of a digital font. For example, the term "font feature" includes font glyph data, such as glyph curvature, glyph spacing, glyph size, glyph shape, glyph width, glyph height, glyph location (e.g., glyph location in relation to the baseline), glyph area, glyph orientation, number of curves per glyph, arc length, or glyph contrast. Thus, for example, the term "font feature" includes a set of numeric metrics used by a machine-learning algorithm. The term "font feature" can include font classification features (e.g., font features utilized to classify a digital font) and/or font similarity features (e.g., font features utilized to identify similar digital fonts)

As used herein, the term "font classification" refers to a digital font category. In particular, the term "font classification" includes pre-defined categories utilized to classify digital fonts into groups. For instance, font classifications include font classes (i.e., Serif, Sans Serif, Slab Serif, Script, Blackletter, Mono, Hand, or Decorative), weights (e.g., light, regular, and heavy weights), widths (e.g., condensed, regular, and extended widths), x-heights (e.g., small, regular and large x-heights), contrasts (e.g., low, regular, and high contrasts), capitalization styles, figures styles, or attributes (e.g., angular, artistic, attention-grabbing, attractive, bad, boring, calm, capitals, charming, clumsy, complex, cursive, delicate, disorderly, display, dramatic, formal, fresh, friendly, gentle, graceful, happy, italic, legible, modern, monospace, playful, pretentious, sharp, sloppy, soft, strong, technical, thin, warm, or wide).

As mentioned, the digital font classification system utilizes font features and a font feature database to determine one more font classifications corresponding to a digital font. For example, the digital font classification system detects font features (e.g., glyph shape, glyph width) of a new digital font and compares the font features to font features of the font feature database. Based on the comparison, the digital font classification system determines one or more font classifications corresponding to the new digital font.

For example, the digital font classification system detects a new digital font stored in a font folder on the computing device 100. The digital font classification system can detect a serif mark at the bottom of the characters of the new digital font, a width of the glyphs in the new digital font, and a curvature of the glyphs of the new digital font. The digital font classification system compares the detected font features to the font features of the font feature database, for example by identifying rows and/or columns of the font feature database that have the serif mark, the width, and the curvature. The digital font classification system then utilizes the font feature database to identify font classification for the new digital font and determine that the new digital font is a Serif class with an extended width and a playful attribute.

Upon determining font classifications corresponding to the new digital font, the digital font classification system can modify the digital font database. In particular, the digital font classification system can update the digital font database to associate the new digital font and corresponding font characteristics. For instance, using the previous example, the digital font classification system updates the digital font database to associate the new digital font with the following font classifications: Serif class, extended width, and playful attribute.

In addition to classifying a single new digital font, the digital font classification system can also detect and classify a plurality of new digital fonts. For example, the digital font classification system searches a repository of digital fonts and identify a plurality of new digital fonts. The digital font classification system can classify the new digital fonts and update a digital font database to include the new digital fonts.

In one or more embodiments, the digital font classification system determines a priority order corresponding to a plurality of new digital fonts. Indeed, because it can take time to classify digital fonts, the digital font classification system can establish a priority order for identifying font classifications corresponding to a plurality of digital fonts. Moreover, the digital font classification system then classifies the plurality of digital fonts according to the priority order. In this manner, the digital font classification system reduces the amount of time required for a user to search for, identify, and utilize particular digital fonts.

The digital font classification system can determine a priority order based on a variety of factors. For example, in one or more embodiments, the digital font classification system determines a priority order based on time or date (e.g., the time or date that a digital font classification system was created, last modified, downloaded, installed, registered, or accessed). Similarly, in one or more embodiments, the digital font classification system determines a priority order based on how a digital font was created (e.g., prioritize digital fonts created or edited by the computing device 100 over digital fonts downloaded from a remote server or not edited by the computing device 100). In addition, in one or more embodiments, the digital font classification system determines a priority order based on a size of a digital font file corresponding to the digital font (e.g., smaller digital font files prioritized over smaller digital font files to maximize the number of digital fonts classified in the shortest amount of time).

Moreover, upon classifying new digital fonts, the digital font classification system can search for, identify, present, and utilize the new digital fonts. For example, upon adding new digital fonts and corresponding font classifications to a digital font database, the digital font classification system utilizes the digital font database to present the new digital fonts and similar digital fonts via the user interface 104.

Figure 1B:
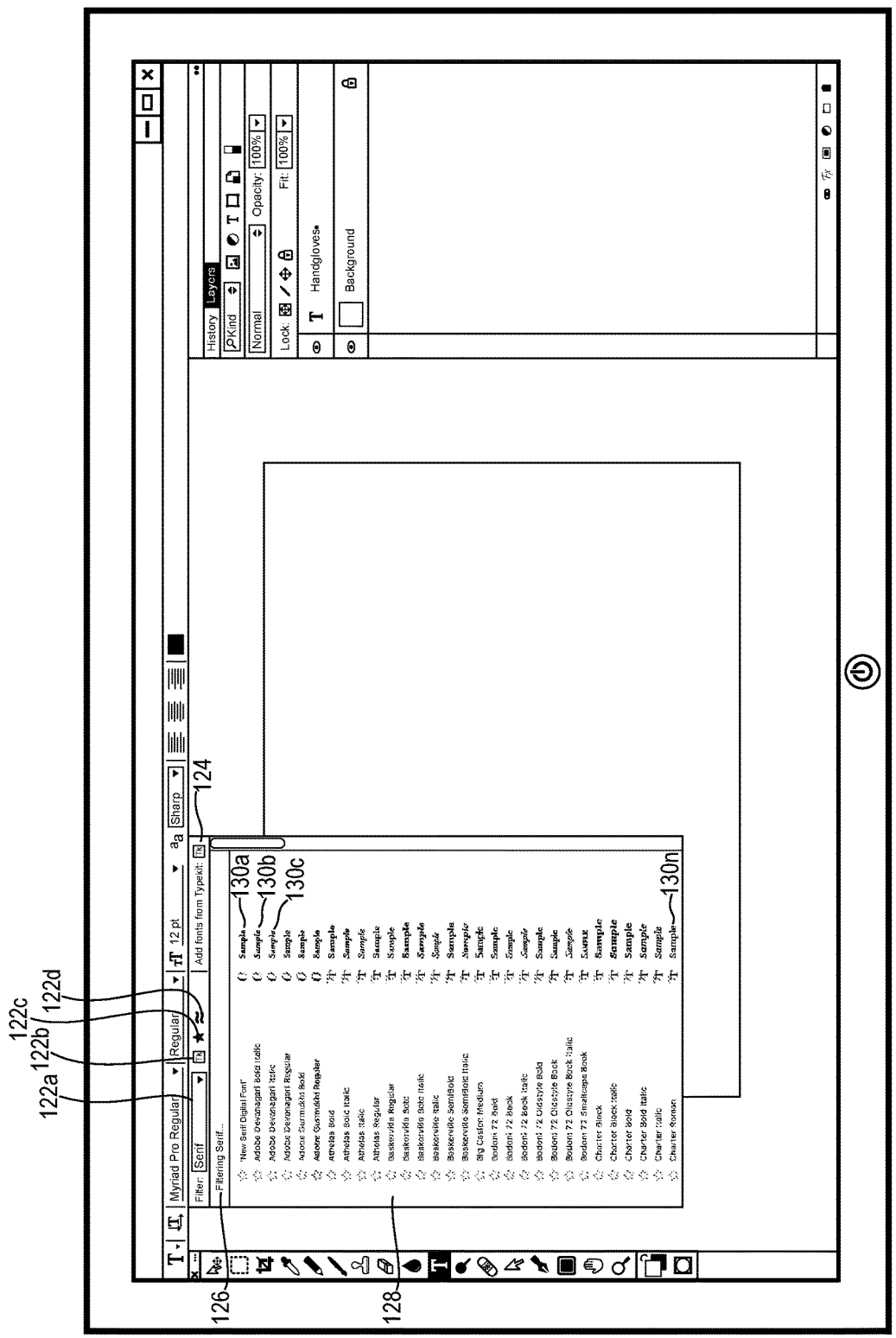
FIG. 1B illustrates the user interface of FIG. 1A with visual representations of digital fonts, including a new digital font, in accordance with one or more embodiments.

For example, FIG. 1B illustrates the computing device 100 and the user interface 104 upon selection of the digital font modification element 116b. As shown in FIG. 1B, the user interface 104 includes a plurality of filter elements or controls 122a-122d (including a font class filter control 122a, a server font filter control 122b, a favorites filter control 122c, and a similar digital font filter control 122d), an add font control 124, a filter summary control 126, and digital font visual representation control 128. Furthermore, the digital font visual representation element 128 comprises a plurality of visual representations 130*a*-130*n* of various digital fonts. In particular, the digital visual representation element 128 includes the new digital font visual representation 130*a*.

The visual representation 130*a* represents a new digital font detected by the digital font classification system (i.e., "New Serif Digital Font"). As described previously, upon detecting the New Serif Digital Font, the digital font classification system classifies the new digital font as belonging to the Serif class and adds the new digital font to a digital font database. Upon selection of the digital font modification element 116*b*, the digital font classifications system accesses the digital font database and provides a visual representation of digital fonts (including the New Serif Digital Font) for display.

With regard to the embodiment of FIG. 1B, the digital font classification system applies a filter (i.e., a search query) to the digital font database and displays the results in the digital font visual representation element 128. Specifically, as shown in the class filter control 122*a* and the filter summary control 126, the digital font classification system filters the digital font database to only display digital fonts corresponding to a Serif class.

In one or more embodiments, the digital font classification system also determines a display order with regard to visual representations included in the digital font representation element 128. For example, as shown in FIG. 1B, the digital font classification system generates a display order based on time corresponding to the digital fonts (e.g., time of creation, download, installation, modification, or detection). Specifically, the digital font classification system prioritizes new digital fonts over existing digital fonts such that new digital fonts appear first in the new digital font representation element 128.

Similarly, in one or more embodiments, the digital font classification system determines a display order based on other factors. For example, the digital font classification system can determine a display order based on use (e.g., frequently utilized digital fonts or recently utilized digital fonts appear first), based on popularity (e.g., digital fonts utilized, purchased, or installed most frequently by a plurality of users appear first), or based on title.

Figure 1C:
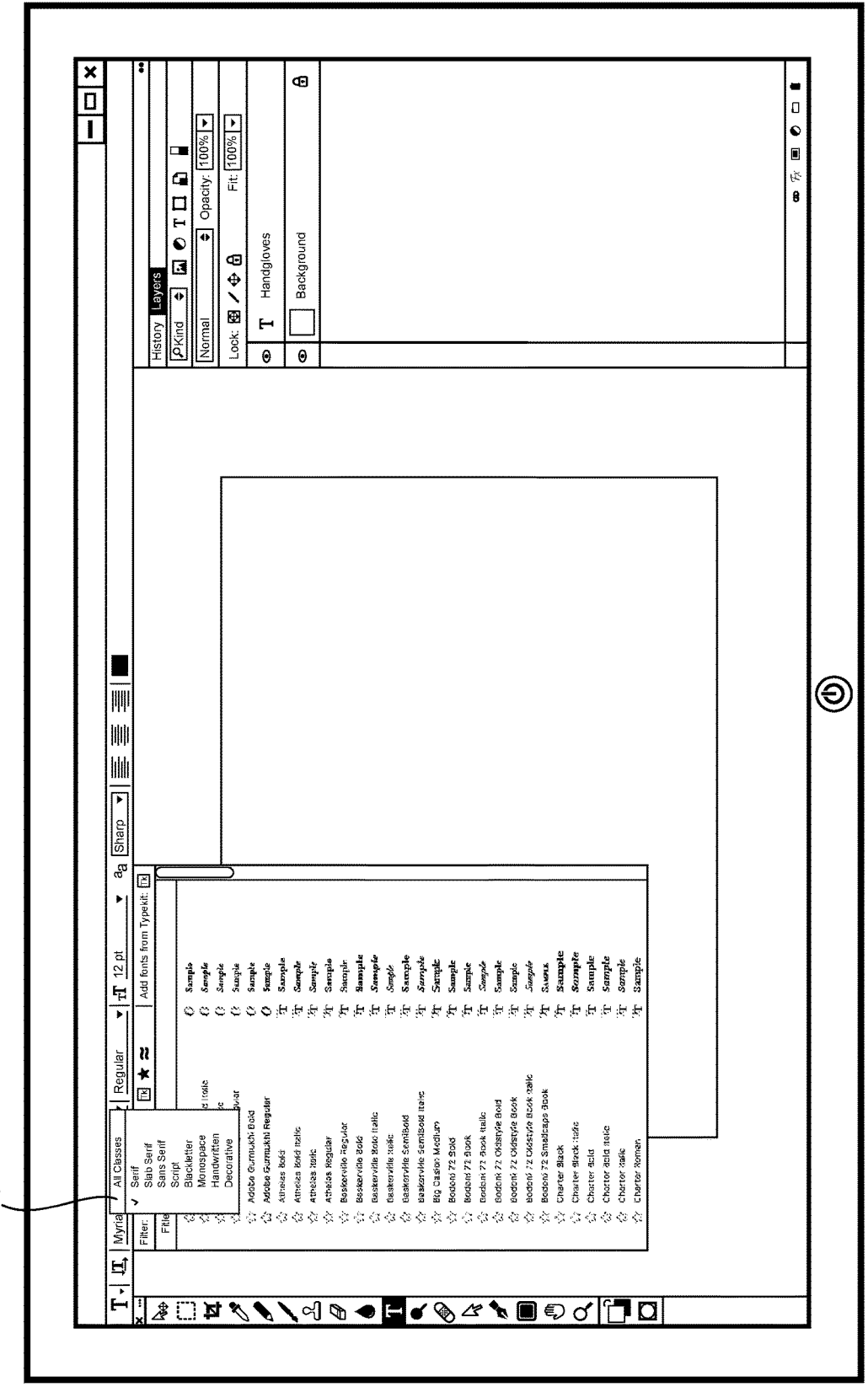
FIG. 1C illustrates the user interface of FIG. 1A showing a font class selection in accordance with one or more embodiments.

In addition, the digital font classification system can also modify a search query and display digital fonts corresponding to the modified search query. For example, FIG. 1C illustrates the user interface 104 upon selection of the font class filter control 122*a*. Specifically, FIG. 1C shows a font class selection control 140 which includes a plurality of font classes. As shown, the font class "Serif" is currently selected (and the digital font classification system is currently filtering according to the Serif class). However, based on user interaction with the font class selection control 140, the digital font classification system modifies a filter. For example, upon user selection of "Script" the digital font classification system generates a search query for digital fonts corresponding to a Script class font classification.

Figure 1D:
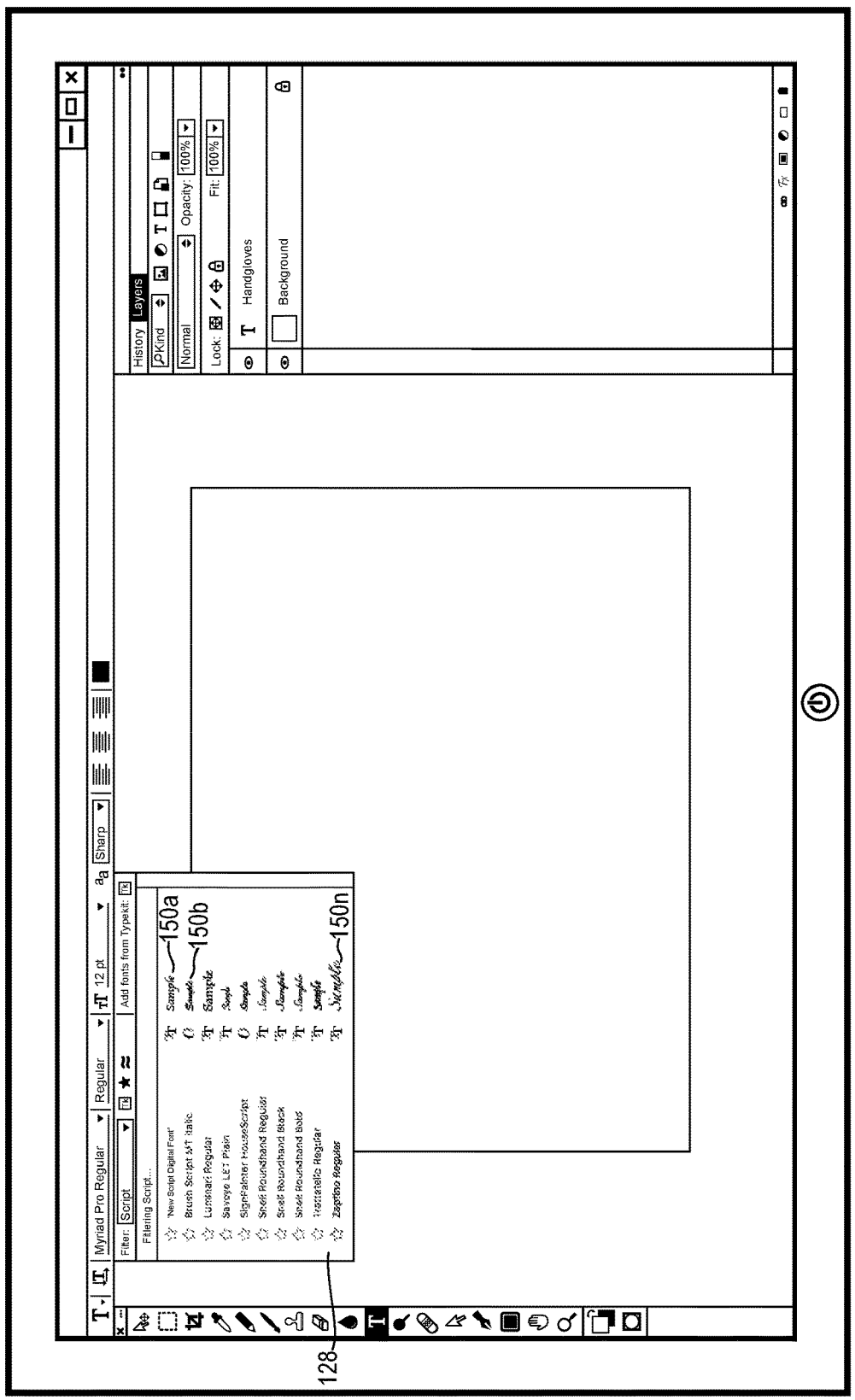
FIG. 1D illustrates the user interface of FIG. 1A with visual representations of digital fonts resulting from a search in accordance with one or more embodiments.

Specifically, FIG. 1D illustrates the user interface 104 upon selection of the Script class in the font class selection control 140. In particular, FIG. 1D illustrates the digital font representation control 128 comprising visual representations 150*a*-150*n* of digital fonts corresponding to the Script class. In particular, the digital font representation control 128 includes the new digital font representation 150*a* corresponding to a new digital font detected and classified by the digital font classification system (i.e., "New Script Digital Font"). The digital font classification system determines that the New Script Digital Font corresponds to the Script class and displays the visual representation 150*a* upon selection of the Script class in the font class selection control 140. In this manner, the digital font classification system can automatically search for, identify, and present new digital fonts.

Although FIG. 1C illustrates searching (or filtering) based on a particular font class, the digital font classification system can generate a search query (e.g., filter) based on any font classification. For example, in addition to font class, the digital font classification system also generates a search query based on weight, width, x-height, contrast, attribute, capitalization style, language, or figure style.

In addition, the digital font classification system can also utilize a search query or filter based on other factors. For example, based on user interaction with the server font filter element 122*b*, the digital font classification system generates a search query based on whether a digital font is available on a remote server. In particular, in one or more embodiments, the electronic document application 106 accesses a remote server having a repository of digital fonts. The digital font classification system applies a filter such that the digital font visual representation control 128 displays visual representations of digital fonts available via the remote server and the repository of digital fonts. Specifically, in one or more embodiments, user interaction with the server font filter control 122*b* filters for digital fonts available via the ADOBE® TYPEKIT® cloud-based digital font service.

Similarly, the digital font classification system can also utilize a search query based on one or more favorite fonts. In particular, based on user interaction with the favorites filter control 122*c* the digital font classification system can generate a search query based on favorite digital fonts. The digital font classification system determines favorite digital fonts based on a variety of factors. In one or more embodiments, the digital font classification system determines favorite digital fonts based on usage (e.g., frequency of usage by a user of the computing device 100). Similarly, in one or more embodiments, the digital font classification system determines favorite digital fonts based on user input (e.g., marking or tagging a digital font as a favorite digital font by a user).

In addition, the digital font classification system can also generate a search query based on similarity. In particular, based on user interaction with the similar digital font filter control 122*d* the digital font classification system searches for digital fonts similar to a particular digital font. For instance, the digital font classification system searches for and presents digital fonts similar to a new digital font. Similarly, the digital font classification system can search for digital fonts similar to an existing digital font, determine that a new digital font is similar to the existing digital font, and provide the new digital font for display.

As mentioned previously (and as described in greater detail with regard to FIGS. 4A-4B), the digital font classification system can identify similar digital fonts by comparing features of one or more digital fonts. In particular, in one or more embodiments, the digital font classification system generates feature vectors corresponding to a plurality of digital fonts and compares the feature vectors to identify similar digital fonts. For example, the digital font classification system generates a feature vector corresponding to a new digital font and generates a feature vector corresponding to a plurality of other digital fonts. Specifically, the digital font classification system identifies feature vectors of a plurality of other digital fonts with the nearest L2 distance to the feature vector of the new digital font. The feature vectors with the nearest L2 distance are identified as similar (or complementary) digital fonts and provided for display.

Figure 1E:
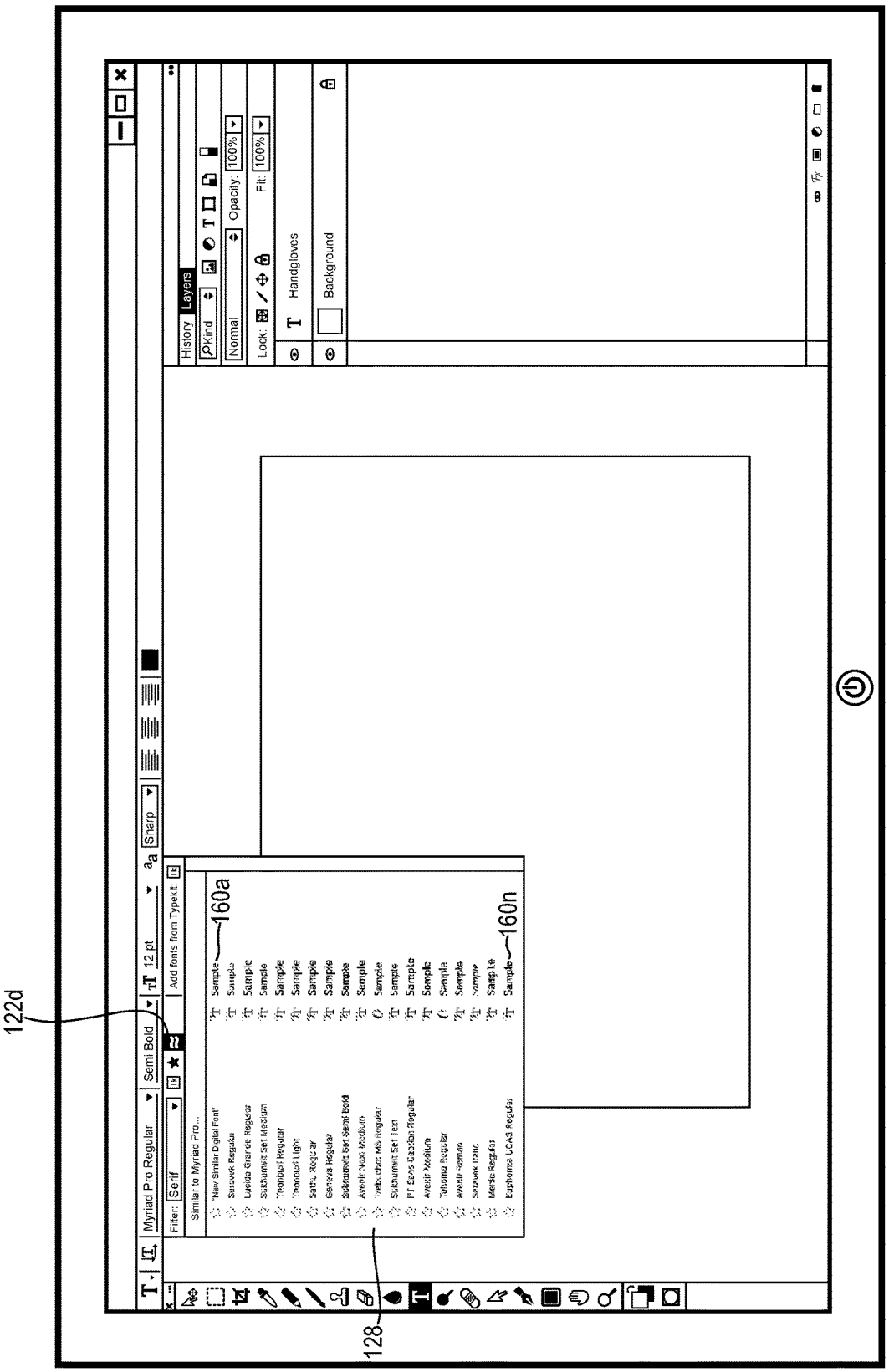
FIG. 1E illustrates the user interface of FIG. 1A with a similar digital font filter element and visual representations of digital fonts resulting from a search for similar digital fonts in accordance with one or more embodiments.

For example, FIG. 1E illustrates the user interface 104 upon user interaction with the complimentary digital font control 122*d*. Upon user interaction with the complimentary digital font control 122*d*, the digital font classification system determines fonts complimentary to the current digital font 112 (i.e., Myriad Pro Regular). Specifically, the digital font classification system identifies a feature vector for the current digital font 112 and compares the feature vector of the current digital font 112 to feature vectors corresponding to other digital fonts (i.e., compares feature vectors from digital fonts stored in a digital font database).

Based on the comparison, the digital font classification system identifies a plurality of similar digital fonts (i.e., digital fonts with feature vectors nearest to the feature vector of the current digital font 112). Moreover, as shown in FIG. 1E, the digital font classification system generates visual representations 160*a*-160*n* corresponding to the identified similar digital font and includes the visual representations 160*a*-160*n* in the digital font visual representation element 128.

As shown, the digital font visual representation element 128 includes a visual representation 160*a* corresponding to a new digital font (i.e., "New Similar Digital Font"). The digital font classification system detects the New Similar Digital Font on the computing device 100 and generates a feature vector corresponding to the New Similar Digital Font. Moreover, upon selection of the similar digital font filter control 122*d*, the digital font classification system compares the feature vector of the New Similar Digital Font to the feature vector of the current digital font 112 and identifies a correspondence between the two feature vectors (e.g., determines that the feature vectors are in close proximity). Accordingly, the digital font classification system includes the visual representation 160*a* corresponding to the new digital font in the digital font visual representation control 128.

In addition to identifying similar digital fonts, the digital font classification system can also apply digital fonts to digital text. In particular, the digital font classification system can apply digital fonts to the digital text 110 via the user interface 104. Indeed, upon selection of any of the visual representations 130*a*-130*n*, 150*a*-150*n*, or 160*a*-160*n* the digital font classification system applies the selected digital font to the digital text 110 of the electronic document 108. Thus, for example, with regard to FIG. 1E, a user can select the visual representation 130*a* of the New Similar Digital Font, in response to which the digital font classification system applies the New Similar Digital Font to the digital text 110.

Notably, from the perspective of a user of the computing device 100, upon executing the electronic document application 106, the digital font classification system automatically makes new digital fonts available for presentation, search, and utilization via the user interface 104. Indeed, as illustrated with regard to FIGS. 1A-1E, the digital font classification system detects, classifies, and incorporates the new digital fonts (e.g., the New Serif Digital Font, the New Script Digital Font, and the New Similar Digital Font) into the user interface 104 without requiring any user interaction or user input. For example, the user is not required to load new digital fonts into the electronic document application 106, the user is not required to apply tags or labels to the new digital fonts, and the user is not required to assign font categories to the new digital fonts. Moreover, the user is not required to sort through all available digital fonts in order to identify and utilize new digital fonts. Rather, because the digital font classification system automatically detects and classifies the new digital fonts, a user can quickly and efficiently identify new digital fonts and similar digital fonts via the user interface 104.

As shown in FIG. 1E, the digital font classification system can also add digital fonts to the computing device 100. In particular, as illustrated in FIG. 1E, the user interface 104 includes the add font control 124. Upon user interaction with the add font control 124, the digital font classification system adds digital fonts from a remote server. For example, as mentioned previously, the electronic document application 106 can operate in conjunction with a cloud-based service hosted at a web server (e.g., the ADOBE® TYPE-KIT® cloud-based digital font service). Upon user interaction with the add font control 124, the digital font classification system can connect with a remote server and access one or more digital fonts.

In one or more embodiments, the computing device accesses one or more new digital fonts via the add font control 124. For example, upon classifying a new digital font on the computing device 100 (e.g., New Script Digital Font), and in accordance with user permission and privacy settings, the digital font classification system can upload the new digital font to a remote server (e.g., upload the New Script Digital Font to a cloud-based digital font service). The computing device 100 and other computing devices can interact with the remote server to search, identify, select, and utilize the new digital font.

For example, another computing device can search the remote server and identify the new digital font (e.g., another computing device can search for, identify, download, and/or utilize the New Script Digital Font created on the computing device 100). Indeed, it will be appreciated that in one or more embodiments the user interface 104 operates as part of a web browser interacting with the electronic document application 106 being hosted in whole or in part on a web server.

Indeed, in one or more embodiments, the digital font classification system can make a new digital font available to multiple computing devices. For example, the computing device 100 can detect and classify a new digital font. The computing device 100 can send the new digital font and corresponding font classifications to a remote server. The remote server can then provide the new digital font and/or corresponding font classifications to other computing devices.

In one or more embodiments the digital font classification system synchronizes a new digital font with a plurality of computing devices of a particular user. For example, a user can create a new digital font. The digital font classification system can detect and classify the new digital font, send the new digital font and font classifications to a remote server, which sends the new digital font and font classifications to a second computing device (e.g., a mobile device) associated with the user. In this manner, the digital font classification system provides automatic, dynamic, and frictionless classification of new digital fonts across computing devices.

Similarly, the digital font classification system can provide automatic classification and sharing of new digital fonts across devices of different users. For example, the digital font classification system can detect and classify a new digital font, send the new digital font to a remote server, which makes the new digital font available to other computing devices (consistent with user privacy and preference settings).

Figure 2A:
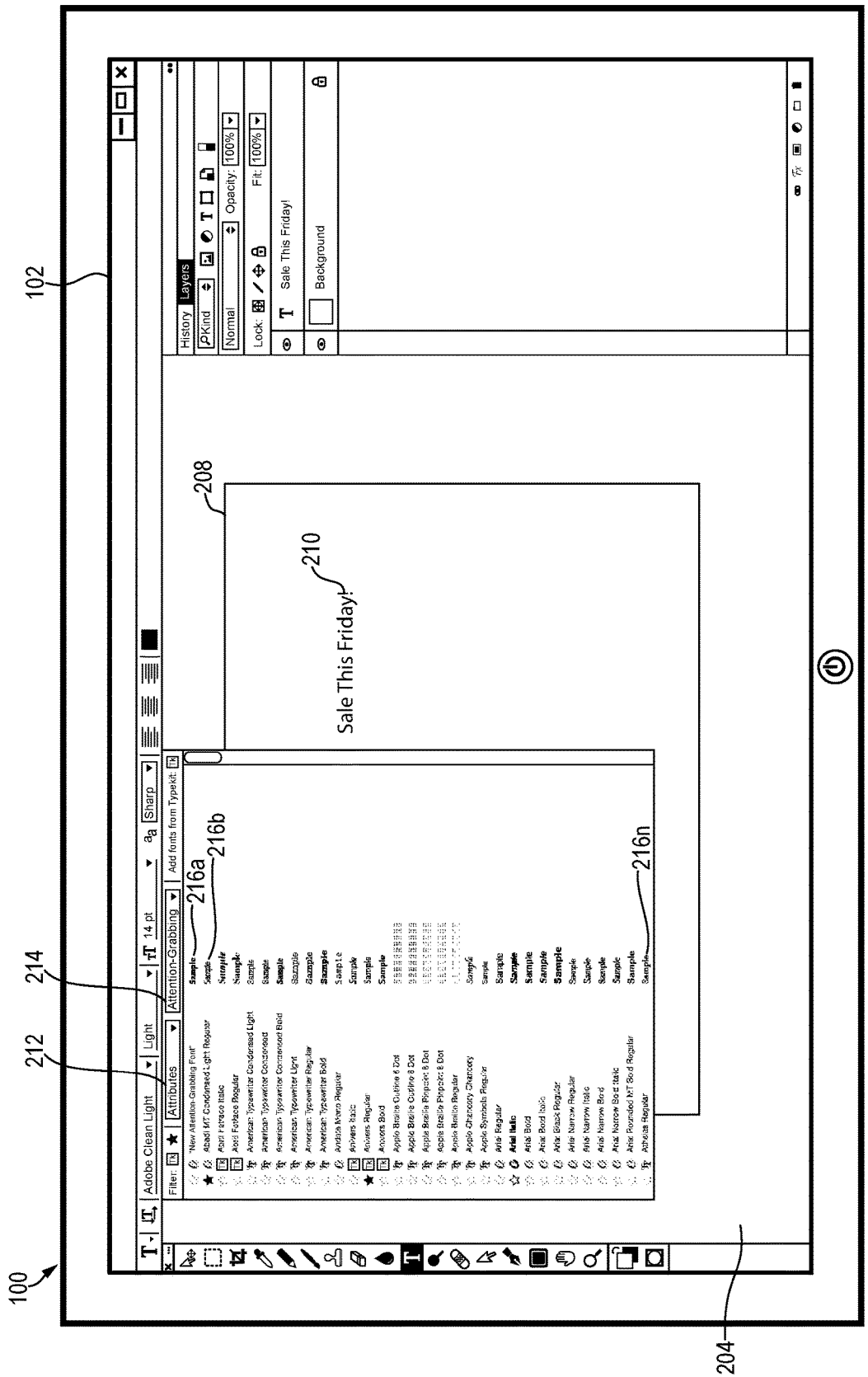
FIG. 2A illustrates a user interface for creating and editing electronic document with a filter element for searching digital fonts based on font attribute in accordance with one or more embodiments.
Figure 2B:
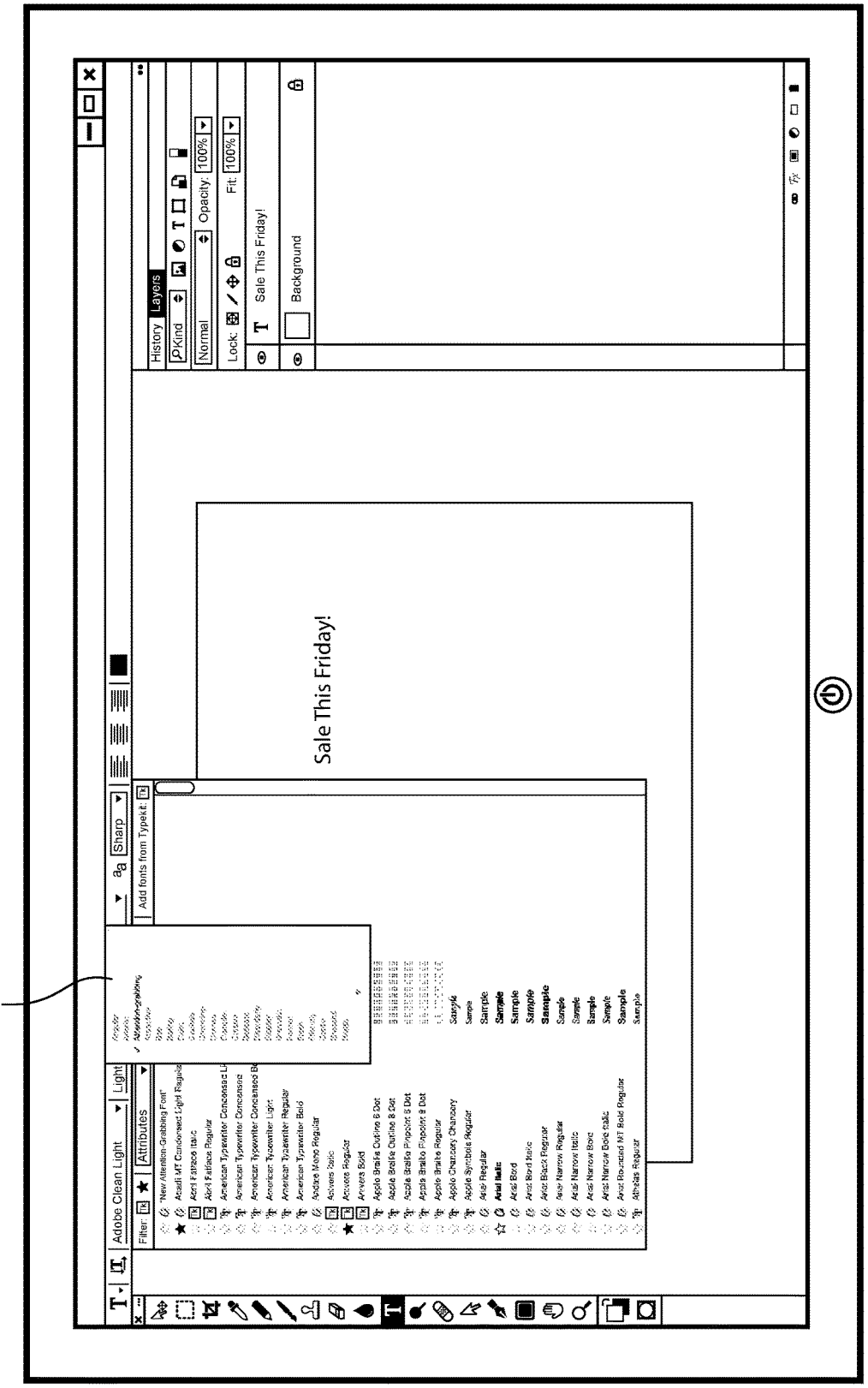
FIG. 2B illustrates the user interface of FIG. 2A with an element for selecting one or more attributes in accordance with one or more embodiments.
Figure 3A:
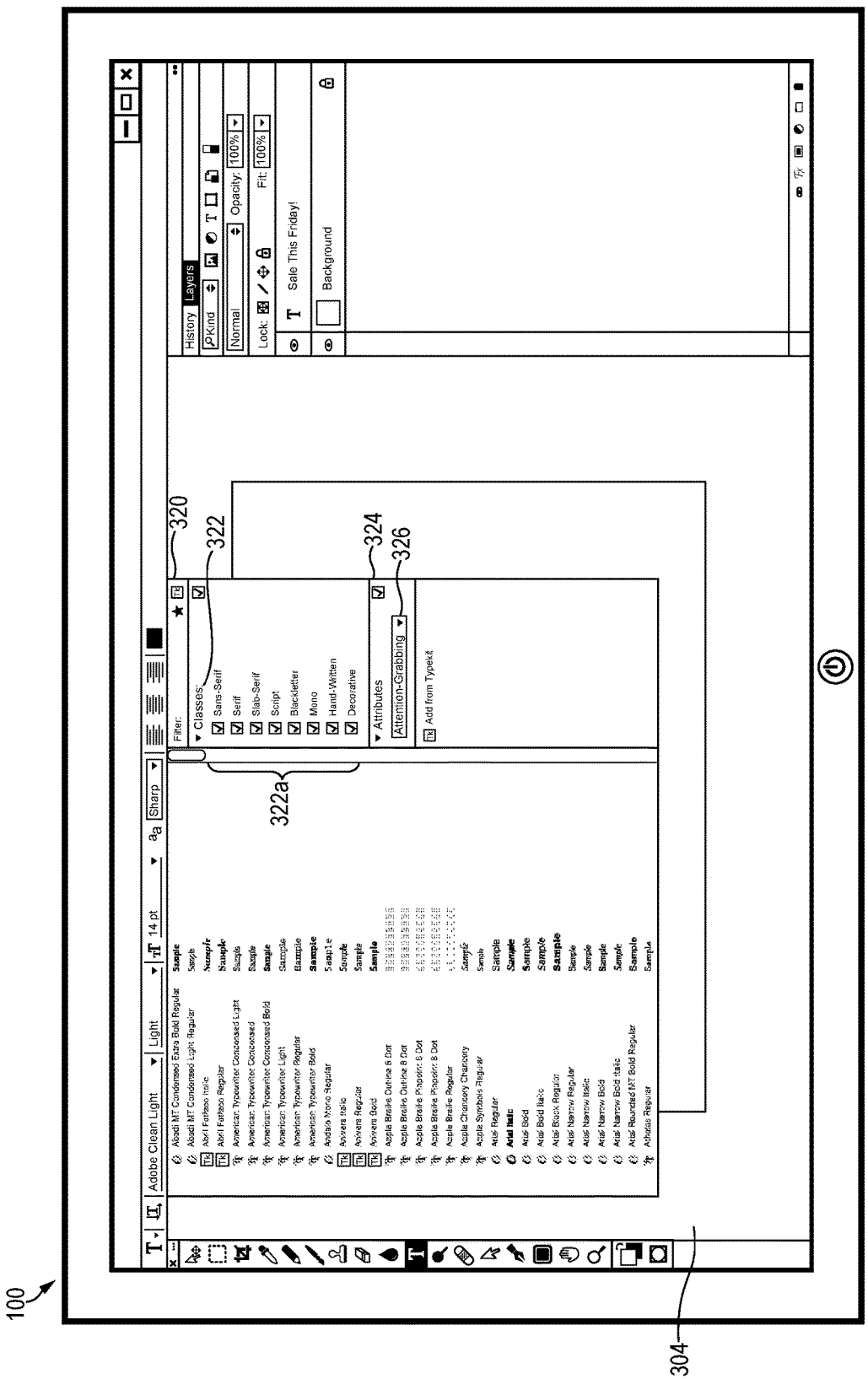
FIG. 3A illustrates a user interface for creating and editing electronic document with options for searching digital fonts by attribute in accordance with one or more embodiments.
Figure 3B:
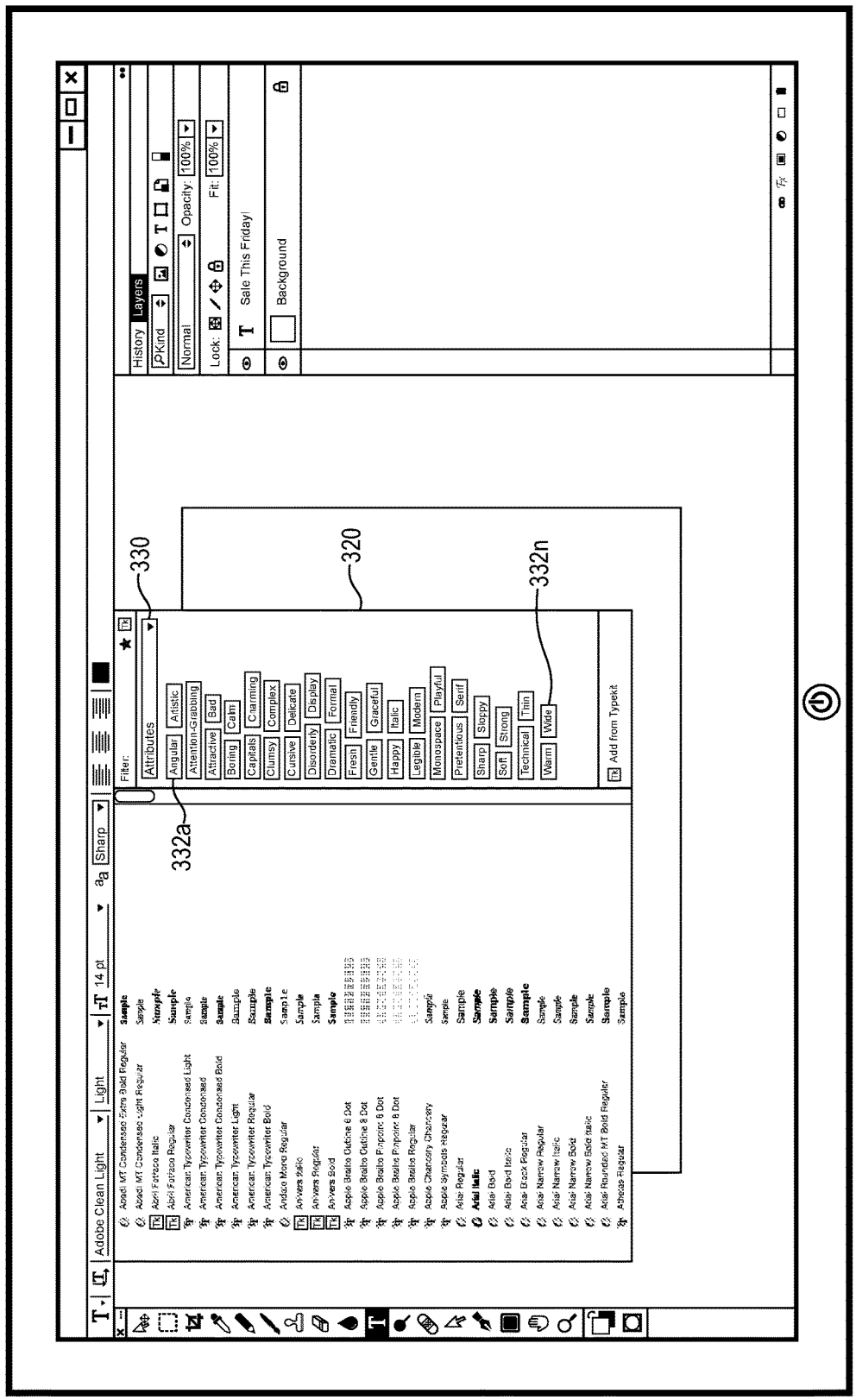
FIG. 3B illustrates the user interface of FIG. 3A with an option for selecting one or more attributes in accordance with one or more embodiments.

In addition, it will be appreciated that although the user interface 104 of FIGS. 1A-1E illustrates a particular set of user interface controls and searches, the digital font classification system can also utilize other interface controls and searches to identify digital fonts. For example, FIGS. 2A-2B and FIGS. 3A-3C illustrate additional user interfaces in accordance with one or more embodiments. In particular FIGS. 2A-2B illustrate a user interface with controls for searching digital fonts based on font attributes. Moreover, FIGS. 3A-3B illustrate a user interface with elements implemented in a side bar tool for searching digital fonts based on font attributes and other font classifications.

Specifically, FIG. 2A illustrates the computing device 100 showing a user interface 204 corresponding to the electronic document application 106 via the display screen 102. The user interface 204 includes an electronic document 208 with digital text 210. Moreover, the user interface 204 also includes the font classification filter selection control 212 and an attribute filter control 214.

As described above, the digital font classification system generates a search query with regard to one or more font classifications. The font classification filter selection control 212 enables a user to select different font classifications for generating a search query. In particular, as shown in FIG. 2A, the font classification filter selection control 212 is selected to filter with regard to attributes. Accordingly, the digital font classification system also includes the attribute filter element 214.

Upon user interaction with the attribute filter control 214, the digital font classification system provides a control for selecting an attribute. In particular, as shown in FIG. 2B, the user interface 204 provides an attribute selection control 220. As illustrated, the attribute selection control 220 includes a plurality of font attributes, including angular, artistic, and attention-grabbing, attractive, bad, boring, calm, capitals, charming, clumsy, complex, cursive, delicate, disorderly, display, dramatic, formal, fresh, friendly, gentle, graceful, and happy.

Upon selection of one or more of the font attributes from the attribute selection control 220, the digital font classification system applies a filter to identify digital fonts that correspond to the selected attributes. For example, in response to selection of the "Attention-grabbing" font attribute, the digital font classification system identifies digital fonts (e.g., from the digital font database) corresponding to the "Attention-grabbing" font attribute and provide the identified digital fonts for display.

Thus, as shown in FIG. 2A, the digital font classification system provides a plurality of visual representations 216a-216n of digital fonts corresponding to an "Attention-grabbing" attribute. In particular, the digital font classification system detects, classifies, identifies, and provides for display a new digital font (i.e., "New Attention-Grabbing Digital Font"), shown as visual representation 216a in FIG. 2A.

It will be appreciated that the font classification filter selection control 212 can enable a user to modify a search query with regard to any font classification. For example, although FIGS. 2A-2B illustrate modifying a search query with regard to font attributes, the digital font classification system can also modify a search query with regard to other font classifications described herein (e.g., x-height, width, or contrast).

Moreover, although FIG. 2A illustrates the font classification filter selection control 212 and the attribute filter control 214 in a particular location and implementation on the user interface 204, it will be appreciated that the digital font classification system can generate alternative elements and arrangements. For example, the digital font classification system can also provide one or more filter elements in a side bar with alternative selectable elements.

For instance, FIG. 3A illustrates the computing device 100 displaying a user interface 304. The user interface 304 includes a filter side bar 320 comprising collapsible classes filter control 322 with a plurality of individual class filter controls 322a. As shown, the classes filter control 322 and the plurality of individual class filter controls 322 comprise check boxes. When one or more of the plurality of individual class filter controls 322 are selected (as shown), the digital font classification system adds the corresponding class to a search query. Thus, with regard to FIG. 3A, the digital font classification system generates and applies a search query that includes all font classes. Moreover, unselecting one of the check boxes removes the corresponding font class form a search query.

As shown, the filter side bar 320 also includes the collapsible attribute filter control 324 and the attribute identification control 326. Upon user interaction with the attribute identification control 326, the digital font classification system can provide an attribute selection element comprising a list of attributes for selection by the user.

FIG. 3B illustrates another arrangement of user interface controls for selecting attributes with regard to a search query. In particular, FIG. 3B illustrates the filter side bar 320 with a font classification filter selection control 330. Moreover, the filter side bar 320 comprises a plurality of individual attribute selection controls 332a-332n. In response to selection of the individual attribute selection controls 332a-332n, digital font classification system generates a search query corresponding to the selected attributes. Moreover, the digital selection identifies digital fonts corresponding to the search query (i.e., the selected attributes) and provides the selected digital fonts for display.

Figure 4A:
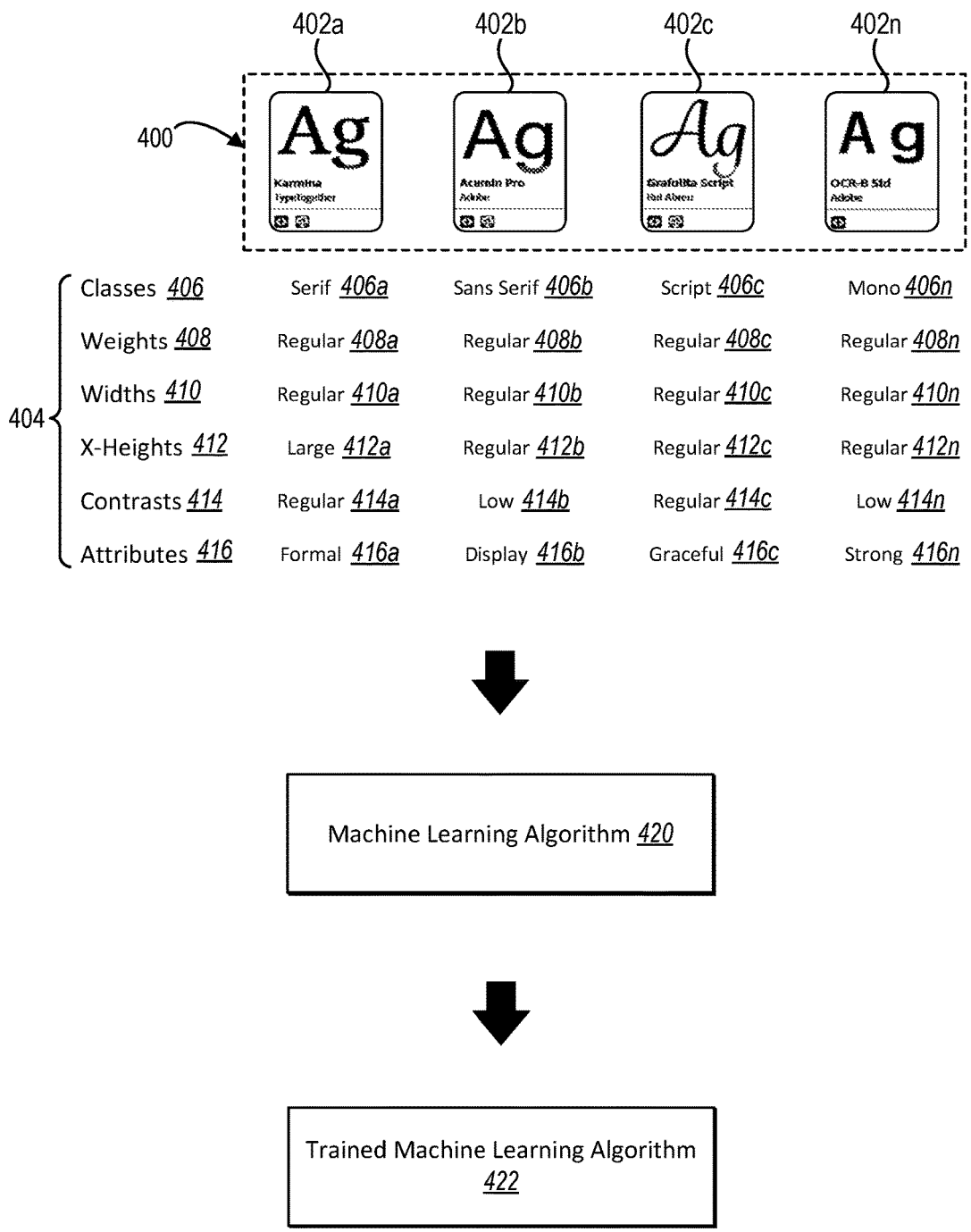
FIG. 4A illustrates a representation of training a machine learning algorithm with training digital fonts and training font classifications in accordance with one or more embodiments.
Figure 4B:
FIG. 4B illustrates utilizing a trained machine learning algorithm to classify a new digital font in accordance with one or more embodiments.
Figure 4B:
Figure 4B:

Turning now to FIGS. 4A-4B additional detail will be provided regarding generating and utilizing a trained machine learning model to classify and identify digital fonts. In particular, FIG. 4A illustrates a repository of training digital fonts 400 comprising a plurality of training digital fonts 402a-402n. As shown, the repository of training digital fonts 400 associates the plurality of training digital fonts 402a-402n with a plurality of training font classifications 404. Specifically, the repository of training digital fonts 400 associated the plurality of training digital fonts 402a-402n with classes 406, weights 408, widths 410, x-heights 412, contrasts 414, and attributes 416.

In one or more embodiments, the digital font classification system generates the repository of training digital fonts 400. In particular, in one or more embodiments, the digital font classification system obtains the plurality of training digital fonts 402a-402n and identifies the corresponding training font classifications 404. For example, in one or more embodiments, the digital font classification system utilizes crowd sourcing techniques to identify the training font classifications 404. For instance, in one or more embodiments, the digital font classification system provides the plurality of training digital fonts 402a-402n to a plurality of individuals and asks the individuals to identify the attributes 416 corresponding to the plurality of training digital fonts 402a-402n. In particular, in one or more embodiments, the digital font classification system utilizes a two-alternative forced choice design to estimate an attribute value corresponding to a digital font (i.e., the attributes 416).

Similarly, in one or more embodiments, the digital font classification system generates the repository of training digital fonts 400 from one or more pre-classified sets of fonts. For example, the digital font classification system can access one or more pre-classified digital fonts from a third-party to generate the repository of training digital fonts 400.

As illustrated in FIG. 4A, upon creating or accessing the repository of training digital fonts 400, the digital font classification system can provide the repository of training digital fonts 400 as input to a machine learning algorithm. As used herein, the term "machine learning algorithm" refers to a model that utilizes training inputs to make predictions. For example, "machine learning algorithm" includes gradient boosted regression trees or a linear LASSO model. Similarly, the term "machine learning algorithm" includes a convolutional neural network ("CNN").

In one or more embodiments, the digital font classification system generates input data from the repository of training digital fonts 400 to provide to a machine learning algorithm 420. For example, in one or more embodiments, the digital font classification system detects font features corresponding to the training digital fonts 402a-402n. In particular, the digital font classification system can detect font features comprising raw glyph outline control points and points sampled from glyph outline curves. For example, the digital font classification system selects features that measure size, area, orientation, stroke width, and spacing of characters. The digital font classification system can also detect features such as curvature, number of curves per glyph, or arc length. The digital font classification system generates feature vectors that reflect the features corresponding to each digital font. In one or more embodiments, the digital font classification system provides detected font features and the training font classifications 404 to the machine learning algorithm 420.

As illustrated in FIG. 4A, the digital font classification system can generate a trained machine learning algorithm/model 422. In particular, by providing the machine learning algorithm/model 420 with the training digital fonts 402a-402n (e.g., features corresponding to the training digital fonts 402a-402n) together with the training font classifications 404, the digital font classification system can generate the trained machine learning algorithm/model 422.

The digital font classification system then utilizes the trained machine learning algorithm/model 422 to classify one or more new digital fonts. For example, as illustrated in FIG. 4B the digital font classification system identifies a new digital font 430. For instance, as described above, the digital font classification system automatically detects the new digital font on a computing device or a remote server. The digital font classification system provides the new digital font 430 to the trained machine learning algorithm/model 422 and the trained machine learning algorithm/model 422 determines font classifications 432. Specifically, the trained machine learning algorithm/model 422 determines a class 436, a weight 438, a width 440, an x-height 442, a contrast 444, or an attribute 446 corresponding to the new digital font 430.

In particular, the digital font classification system detects one or more font features corresponding to the new digital font 430. For instance, as discussed with regard to the training digital fonts 402a-402n, the digital font classification system identifies raw glyph outline control points and points sampled from glyph outline curves. Moreover, the digital font classification system detects features that measure size, area, orientation, stroke width, spacing, curvature, number of curves per glyph, or arc length. The digital font classification system provides the detected features to the trained machine learning algorithm/model 422 and the machine learning algorithm/model 422 utilizes the detected features to determine the font classifications 432.

It will be appreciated that although FIGS. 4A-4B illustrate a particular set of font classifications (e.g., training font classifications 404 and the font classifications 432), the digital font classification system can utilize additional, fewer, or different font classifications. For example, in one or more embodiments, the digital font classification system utilizes a particular training font classification (e.g., the font classes 406) and classifies a new digital font with regard to the particular training font classification (e.g., the font class 436).

In addition to identifying the font classifications 432, the digital font classification system can also identify similar (i.e., complementary) digital fonts. For example, in one or more embodiments, the digital font classification system compares feature vectors corresponding to digital fonts to identify similar digital fonts. Specifically, in one or more embodiments, the digital font classification system identifies similar digital fonts based on the features vectors with the nearest L2, Euclidean, or other distance.

As mentioned above, in one or more embodiments, the digital font classification system utilizes a machine learning model comprising a convolutional neural network. The digital font classification system can also utilize the convolutional neural network to identify similar fonts. In particular, one or more embodiments utilize a convolutional neural network where layers of the convolutional neural network reflect features (e.g., feature vectors) of one or more digital fonts. Accordingly, in one or more embodiments, the digital font classification utilizes layers of the convolutional neural network that reflect feature vectors and compares features vectors from the convolutional neural network to identify similar digital fonts.

More specifically, in one or more embodiments, the digital font classification system generates the repository of training digital fonts 400 and the trained machine learning algorithm 422 and utilizes the trained machine learning algorithm to identify the new digital font 430 (and/or identify similar digital fonts) as described in Peter O'Donovan, Jānis Lībeks, Aseem Agarwala, Aaron Hertzmann, *Exploratory Font Selection Using Crowdsourced Attributes*, ACM TRANSACTIONS ON GRAPHICS, 2014, 33, 4, incorporated herein by reference.

Moreover, in one or more embodiments, the digital font classification system utilizes the methods and algorithms described in Zhangyang Wang, Jianchao Yang, Hailin Jin, Eli Schechtman, Aseem Agarwala, Jonathan Brandt, Thomas S. Huang, *DeepFont: Identify Your Font from An Image*, arXiv:1507.03196 (Jul. 12, 2015), incorporated herein by reference, to generate the repository of training digital fonts 400 and the trained machine learning algorithm 422 and utilize the trained machine learning algorithm 422 to identify the new digital font 430 (and/or identify similar digital fonts).

Figure 5:
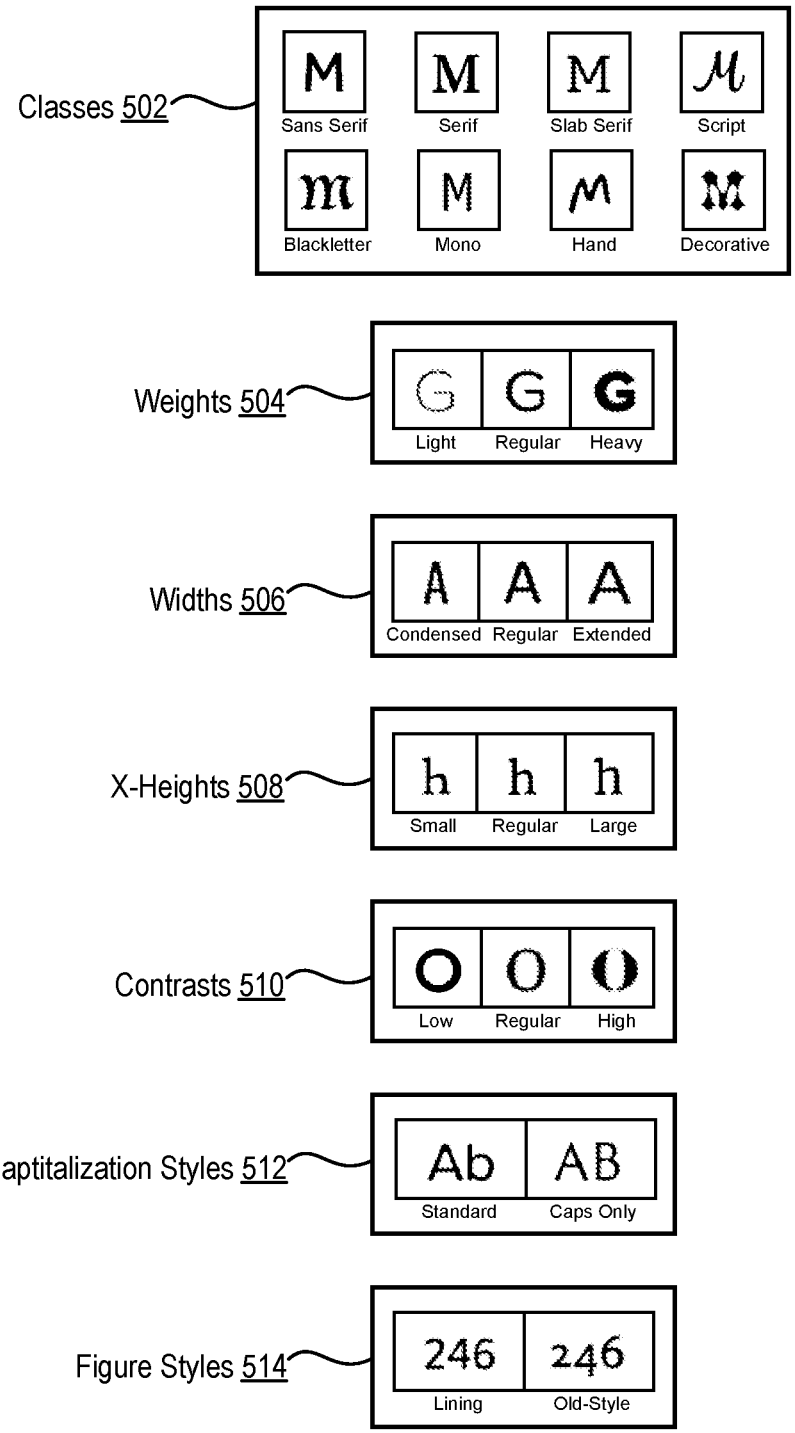
FIG. 5 illustrates a plurality of font characteristics in accordance with one or more embodiments.

Turning now to FIG. 5 additional detail will be providing regarding font classifications utilized in accordance with one or more embodiments. In particular, FIG. 5 illustrates a plurality of font classifications 502-514. More particularly, FIG. 5 illustrates classes 502, weights 504, widths 506, x-heights 508, contrasts 510, capitalization styles 512, and figure styles 514.

As described above, in one or more embodiments, the digital font classification system associates a plurality of digital fonts with regard to one or more font classifications. In particular, the digital font classification system generates and manages a lookup table of digital fonts that associates a plurality of digital fonts with corresponding font classifications. The digital font classification system can dynamically add, modify, and remove digital fonts and corresponding font classifications as digital fonts are generated or modified.

The font classifications 502-514 illustrated in FIG. 5 provide an indication of font classifications utilized to classify digital fonts according to one or more embodiments. Specifically, the digital font classification system can generate and maintain a database that identifies any digital font according to the font classifications 502-514. Moreover, the digital font classification system can search digital fonts based on the font classifications 502-514.

For instance, with regard to the font classes 502, and as shown with regard to the embodiment of FIG. 5, the digital font classification system categorizes digital fonts into eight classes, "Sans Serif," "Serif," "Slab Serif," "Script," "Blackletter", "Mono," "Hand," and "Decorative." It will be appreciated that each of these terms corresponds to recognized typeface categories.

As used herein, and as shown in FIG. 5, font weight describes thickness of strokes (e.g., lines) making up characters in a digital font. Accordingly, in one or more embodiments, with regard to the font weights 504, the digital font classification system divides digital fonts into three classifications (light, regular, and heavy weights) based on the thickness of strokes making up characters in a digital font.

Moreover, as shown in FIG. 5, as used herein font width refers to the width of characters in a digital font. Accordingly, in one or more embodiments, with regard to the font widths 506, the digital font classification system divides digital fonts into three classifications (condensed, regular, and extended widths) based on the width of characters in a digital font.

In addition, as used herein, font x-height refers to the distance between the baseline and the mean line of lower-case letters in a digital font. As shown in FIG. 5, in one or more embodiments, with regard to the font x-heights 508, the digital font classification system divides digital fonts into three classifications (small, regular, and large x-heights) based on the distance between the baseline and the mean line of lower-case letters in a digital font.

As used herein, and as shown in FIG. 5, contrast refers to the difference in thickness of vertical and horizontal strokes in a digital font. As illustrated, in one or more embodiments, with regard to the font contrasts 510, the digital font classification system divides digital fonts into three classifications (low, regular, and high) based on the difference in thickness of vertical and horizontal strokes in a digital font.

Furthermore, in one or more embodiments, with regard to the font capitalization style 512, the digital font classification system divides digital fonts into standard or caps only categories. Similarly, in one or more embodiments, with regard to the font figure styles 514, the digital font classification system divides digital fonts into old-style (i.e., numerals that vary in height and width and variously extend above or below the baseline) or lining (i.e., numerals of uniform height and width) categories.

It will be appreciated that although FIG. 5 illustrates particular font classifications, the digital font classification system can utilize other font classifications. For example, rather than utilizing three classifications of font widths (i.e., condensed, regular, and large), weights, x-heights, etc., in other embodiments, the digital font classification system utilizes a smaller or larger number of classifications. Moreover, although FIG. 5 illustrates particular font classifications, it will be appreciated that the digital font classification system can utilize any type or variety of font classifications.

For example, in one or more embodiments, the digital font classification system also defines digital fonts based on text structure (e.g., paragraph or heading text), language (e.g., languages supported by the font), availability, or glyph curvature.

Figure 6:
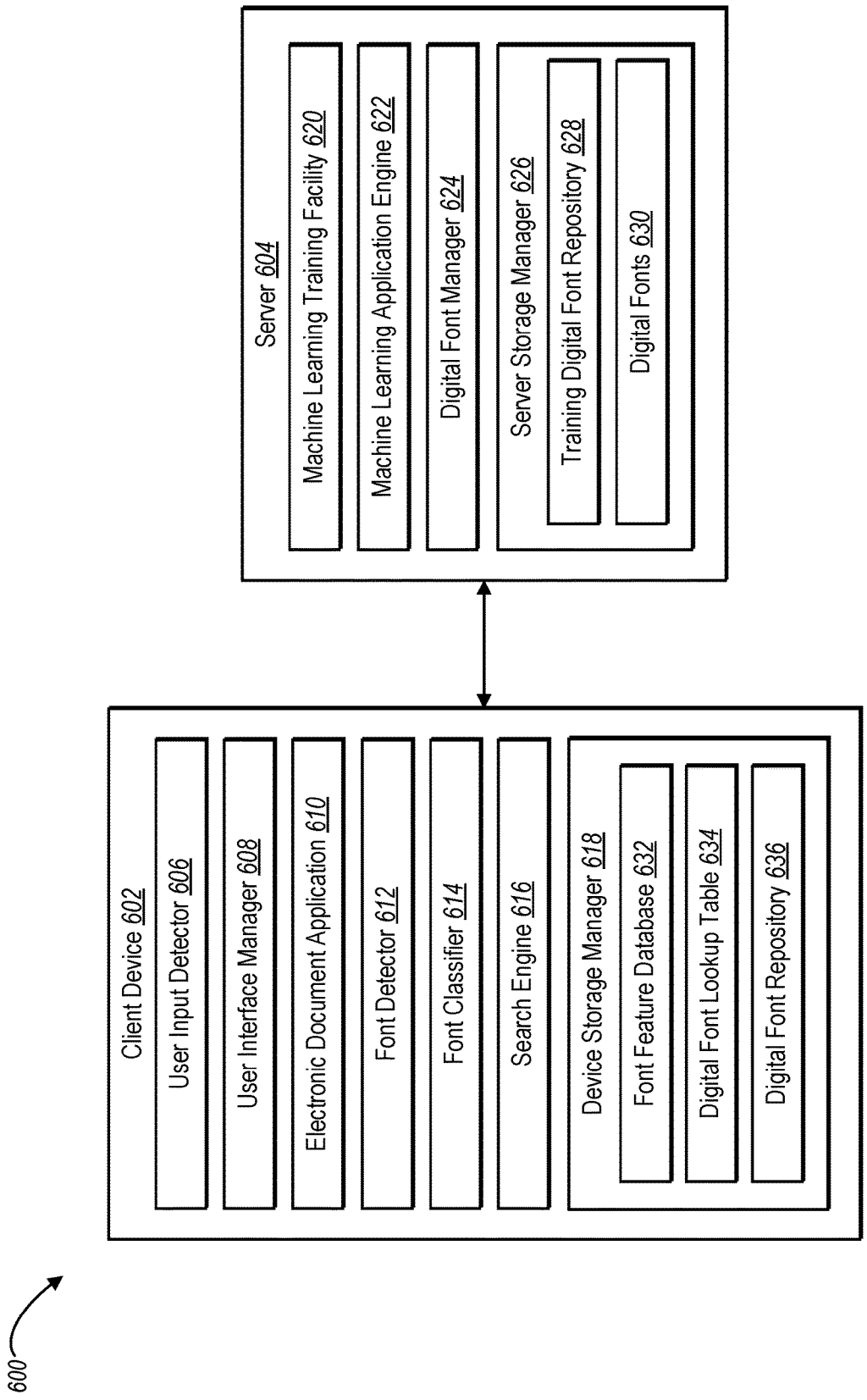
FIG. 6 illustrates a schematic diagram of a digital font classification system in accordance with one or more embodiments.

Turning now to FIG. 6, additional detail is provided regarding components and capabilities of one embodiment of the digital font classification system. In particular, FIG. 6 illustrates an embodiment of an exemplary digital font classification system 600 (e.g., the digital font classification system described above). As shown, the digital font classification system 600 may be implemented, at least in part, on a client device 602 (e.g., the computing device 100) and a server 604. Moreover, as shown, the digital font classification system includes, but is not limited to a user input detector 606, a user interface manager 608, an electronic document application 610, a font detector 612, a font classifier 614, a search engine 616, and a device storage manager 618 (comprising a font feature database 632, digital font lookup table 634, digital font repository 636). Furthermore, as shown in FIG. 6, a portion of the digital font classification system can be implemented on the server 604. As illustrated, the digital font classification system implemented by the server 604 includes, but is not limited to, a machine learning training facility 620, a machine learning application engine 622, a digital font manager 624, and a server storage manager 626 (comprising a training digital font repository 628 and digital fonts 630).

As just mentioned, and as illustrated in FIG. 6, the digital font classification system 600 implemented by the client device 602 includes the user input detector 606. The user input detector 606 detects, identifies, monitors, receives, processes, captures, and/or records various types of user input. For example, the user input detector 606 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 606 operates in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 606 detects and identifies various types of user interactions with user input devices, such as select events, drag events, scroll events, and so forth. For example, in the event the client device 602 includes a touch screen, the user input detector 606 detects one or more touch gestures (e.g., swipe gestures, tap gestures, pinch gestures, or reverse pinch gestures) from a user that forms a user interaction.

The user input detector 606 communicates with, and thus detects user input with respect to a variety of programs, applications, plug-ins, operating systems, user interfaces, or other implementations in software or hardware. For example, the user input detector 606 can recognize user input provided in conjunction with the electronic document application 610.

As just mentioned, and as illustrated in FIG. 6, the digital font classification system 600 implemented by the client device 602 also includes the user interface manager 608. The user interface manager 608 provides, manages, and/or controls a graphical user interface (or simply "user interface") for use with the digital font classification system 600. In particular, the user interface manager 608 can facilitate presentation of information by way of an external component of the client device 602. For example, the user interface manager 608 can display a user interface by way of a display screen associated with the client device 602. The user interface may be composed of a plurality of graphical components, objects, and/or elements that allow a user to perform a function. The user interface manager 608 presents, via the client device 602, a variety of types of information, including text, images, video, audio, characters, or other information. Moreover, the user interface manager 608 provides a variety of user interfaces specific to any variety of functions, programs, applications, plug-ins, devices, operating systems, and/or components of the client device 602 (e.g., the user interfaces 104, 204, and 304).

The user interface manager 608 can provide a user interface with regard to a variety of operations or applications (e.g., the electronic document application 610). For example, the user interface manager 608 provides a user interface that facilitates creating, editing, modifying, storing, uploading, and managing electronic documents. Similarly, the user interface manager 608 can generate a user interface that facilitates utilizing, managing, applying, recommending, or downloading digital fonts. Additional details with respect to various example user interface elements are described throughout with regard to various embodiments containing user interfaces.

Moreover, as shown in FIG. 6, the digital font classification system 600 implemented by the client device 602 also includes the electronic document application 610. The electronic document application 610 can generate, create, modify, edit, and/or manage one or more electronic documents. In particular, the electronic document application 610 can create an electronic document with one or more text elements comprising digital text with one or more digital fonts.

The electronic document application 610 can comprise any application that generates or modifies electronic documents. For example, in one or more embodiments, the electronic document application 610 comprises ADOBE® PHOTOSHOP® software or ADOBE® INDESIGN® software. Moreover, in one or more embodiments, the electronic document application 610 comprises a web browser communicating with a remote server (e.g., the server 604) hosting a website with additional software for creating or editing electronic documents.

The electronic document application 610 can also utilize digital fonts. For example, the electronic document application 610 can generate a text element with digital text utilizing one or more digital fonts.

The electronic document application 610 can also render (e.g., via the user interface manager 608) visual representations. For instance, the electronic document application 610 can render visual representations of one or more electronic documents, textual elements, user interface elements, or digital fonts.

In addition to the electronic document application 610, as shown in FIG. 6, the digital font classification system 600 implemented by the client device 602 may also include the font detector 612. The font detector 612 can identify, determine, detect, find, or locate one or more digital fonts. In particular, the font detector 612 can detect a new digital font on a computing device (or remote server).

In one or more embodiments, the font detector 612 detects execution of the electronic document application 610, and, in response, searches for new digital fonts. In particular, the font detector 612 can search a repository of digital fonts on a computing device or other digital files to identify new digital fonts. For example, the font detector 612 can search the digital font repository 636 for new digital fonts not already included in the digital font lookup table 634.

In addition to the font detector 612, as illustrated in FIG. 6, the digital font classification system 600 implemented by the client device 602 may also include the font classifier 614. The font classifier 614 can classify and/or categorize one or more digital fonts. In particular, the font classifier 614 can determine, detect, and/or identify one or more font classifications corresponding to a digital font.

For instance, in one or more embodiments, the font classifier 614 receives a new digital font (e.g., from the font detector 612) and identifies one or more font classifications corresponding to the new digital font. In one or more embodiments, the font classifier 614 utilizes a font feature database (e.g., the font feature database 632) to classify a new digital font. For example, the font classifier 614 can detect one or more font features corresponding to the new digital font and utilize the font feature database 632 to identify font classifications based on the font features.

In one or more embodiments, the font classifier 614 comprises a machine learning algorithm. In particular, the font classifier 614 can implement all or a portion of a trained machine learning algorithm trained to identify one or more font classifications corresponding to a new digital font (e.g., the machine learning application engine 622).

The font classifier 614 can generate, create, and manage a digital font lookup table (i.e. a database) associating a plurality of digital fonts with corresponding font classifications. In particular, the font classifier 614 can manage the digital font lookup table 634. The font detector 612 can also modify the digital font lookup table 634. For example, the font detector 612 can modify the digital font lookup table 634 to include a new digital font and corresponding font classifications.

As illustrated in FIG. 6, in addition to the font classifier 614, the digital font classification system 600 implemented on the client device 602 can also include the search engine 616. The search engine 616 can search, filter, and/or identify one or more digital fonts. In particular, the search engine 616 can generate, determine, and/or create a search query with search query parameters. Moreover, the search engine 616 can apply a search query to a plurality of digital fonts and identify the digital fonts that satisfy the search query.

Specifically, the search engine 616 can receive a search query comprising a plurality of font classifications (e.g., from the user input detector 606, the user interface manager 608, and/or the electronic document application 610). The search engine 616 can apply the search query to a digital font database (e.g., the digital font lookup table 634). The search engine 616 can identify the digital fonts (e.g., new digital fonts) from the database that satisfy the search query.

In addition, the search engine 616 can provide the results of the search. For example, the search engine 616 can provide search results to the electronic document application 610 for display. The electronic document application 610 can render a visual representation of the search results.

As shown in FIG. 6, the digital font classification system 600 implemented on the client device 602 also includes the device storage manager 618. The device storage manager 618 maintains data for the digital font classification system 600. The device storage manager 618 can maintain data of any type, size, or kind, as necessary to perform the functions of the digital font classification system 600. As illustrated, the device storage manager 618 includes the font feature database 632. The font feature database 632 associates one or more font features with corresponding font classifications. For example, in one or more embodiments, the font feature database 632 is generated by a trained machine learning algorithm (e.g., the machine learning application engine 622) and associates font features (e.g., glyph curvature) with corresponding font classifications (e.g., font class of Decorative) as learned by the trained machine learning algorithm.

In addition, the device storage manager 618 also includes the digital font lookup table 634. The digital font lookup table 634 associates a plurality of digital fonts with corresponding font classifications. For example, the digital font lookup table 634 can include entries associating the font "Myriad Pro Regular" with a "Serif" font class. Although FIG. 6 illustrates the font feature database 632 and the digital font lookup table 634 as separate, it will be appreciated that in one or more embodiments, the font feature database 632 and the digital font lookup table 634 are combined into a single data structure (e.g., both included in the font feature database 632).

As illustrated in FIG. 6, the device storage manager 618 also includes the digital font repository 636. The digital font repository 636 comprises digital fonts stored on the client device 602. For example, the digital font repository 636 includes a plurality of digital font that can be applied to digital text in an electronic document. The digital font repository 636 can also include new digital fonts.

As mentioned above, in addition to the client device 602, the digital font classification system 600 may also be implemented on the server 604. As illustrated in FIG. 6, the digital font classification system 600 implemented on the server 604 includes the machine learning training facility 620. The machine learning training facility 620 can train a machine learning algorithm.

For example, the machine learning training facility 620 can access a repository of training digital fonts and training font classifications (e.g., the training digital font repository 628). Moreover, the machine learning training facility 620 can utilize the training digital fonts and training font classifications to train a machine learning algorithm. Specifically, the machine learning training facility 620 can generate a trained machine learning algorithm to identify font classifications corresponding to a new digital font.

As shown in FIG. 6, the digital font classification system 600 implemented on the server 604 also includes the machine learning application engine 622. The machine learning application engine 622 can utilize and/or apply a trained machine learning algorithm. In particular, the machine learning application engine 622 can utilize a trained machine learning engine to identify font classifications corresponding to a new digital font.

In one or more embodiments, the machine learning application engine 622 generates a font feature database that associates one or more font features with one or more font classifications. For example, the machine learning application engine 622 can generate a font feature database that comprises a plurality of entries or rules that identify one or more font classifications based on one or more font features. The machine learning application engine 622 can provide a font feature database to a client device (e.g., the machine learning application engine 622 can generate and provide the font feature database 632 to the client device 602).

The machine learning application engine 622 can also apply a trained machine learning algorithm to classify a new digital font. For example, in one or more embodiments, the machine learning application engine 622 receives a new digital font from the client device 602 (e.g., via the electronic document application 610 and the digital font manager 624). The machine learning application engine 622 can apply a trained machine earning algorithm to the received new digital font and identify one or more font classifications. Moreover, the machine learning application engine 622 (e.g., via the digital font manager 624) can send the one or more font classifications to the client device 602.

Furthermore, as shown in FIG. 6, the digital font classification system 600 implemented with regard to the server 604 also includes the digital font manager 624. The digital font manager 624 can send, receive, store, and manage one or more digital fonts.

For example, in one or more embodiments, the digital font manager 624 can receive a new digital font from the client device 602. The digital font manager 624 can store the new digital font (e.g., via the digital fonts 630). Moreover, the digital font manager 624 can classify the new digital font (via the machine learning application engine 622).

The digital font manager 624 can also provide a new digital font (and corresponding font classifications) to one or more client devices. For example, the digital font manager 624 can provide a new digital font and corresponding font classifications to the client device 602 or other client devices. For instance, the digital font manager 624 can receive a request for a digital font from a second client device, identify the new digital font (from the client device 602), and provide the new digital font and corresponding font classifications to the second client device.

The digital font manager 624 can also search one or more digital fonts. For example, the digital font manager 624 can receive input of a search query. The digital font manager 624 can search for digital fonts corresponding to the search query (e.g., search the digital fonts 630) and identify digital fonts that satisfy the search query. The digital font manager 624 can also provide the identified digital fonts for display.

In addition, as illustrated in FIG. 6, the server 604 also includes the server storage manager 626. The server storage manager 626 maintains data for the digital font classification system 600. The server storage manager 626 can maintain data of any type, size, or kind, as necessary to perform the functions of the digital font classification system 600. As illustrated, the server storage manager 626 includes the training digital font repository 628. The training digital font repository 628 includes training digital fonts and other data utilized to train a machine learning algorithm. For example, the training digital font repository 628 can include training font classifications or glyph data (e.g., font features with regard to glyphs from digital fonts).

In addition, the server storage manager 626 also includes the digital fonts 630. The digital fonts 630 include any digital fonts or corresponding information utilized by the digital font classification system 600. For example, the digital fonts 630 include digital fonts, font classifications, or font features.

Each of the components 602-626 of the digital font classification system 600 and their corresponding elements (as shown in FIG. 6) may be in communication with one another using any suitable communication technologies. It will be recognized that although components 602-626 of the digital font classification system 600 and their corresponding elements are shown to be separate in FIG. 6, any of components 602-626 and their corresponding elements may be combined into fewer components, such as into a single facility or module, divided into more components, or configured into different components as may serve a particular embodiment.

The components 602-626 of the digital font classification system 600 and their corresponding elements can comprise software, hardware, or both. For example, the components 602-626 and their corresponding elements can comprise one or more instructions stored on a computer-readable storage medium and executable by processors of one or more computing devices. When executed by the one or more processors, the computer-executable instructions of the digital font classification system 600 can cause a client device and/or a server device to perform the methods described herein. Alternatively, the components 602-626 and their corresponding elements can comprise hardware, such as a special purpose processing device to perform a certain function or group of functions. Additionally or alternatively, the components 602-626 and their corresponding elements can comprise a combination of computer-executable instructions and hardware.

Furthermore, the components 602-626 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-626 may be implemented as a stand-alone application, such as a desktop or mobile application. Furthermore, the components 602-626 may be implemented as one or more web-based applications hosted on a remote server. Alternatively or additionally, the components 602-626 may be implemented in a suit of mobile device applications or "apps." To illustrate, the components 906-930 may be implemented in an application, including but not limited to ADOBE® CREATIVE CLOUD® software, ADOBE® CREATIVE CLOUD® PACKAGER software, ADOBE® DOCUMENT CLOUD software, ADOBE® ACROBAT® software, ADOBE® FOTOLIA software, ADOBE® ILLUSTRATOR® software, ADOBE® LIGHTROOM® software, ADOBE® INDESIGN® software, or ADOBE® PHOTOSHOP® software. "ADOBE," "CREATIVE CLOUD," "CREATIVE CLOUD PACKAGER," "DOCUMENT CLOUD," "ACROBAT," "FOTOLIA," "ILLUSTRATOR," "LIGHTROOM," "INDESIGN," and "PHOTOSHOP" are either registered trademarks or trademarks of Adobe Systems Incorporated in the United States and/or other countries.

Figure 7:
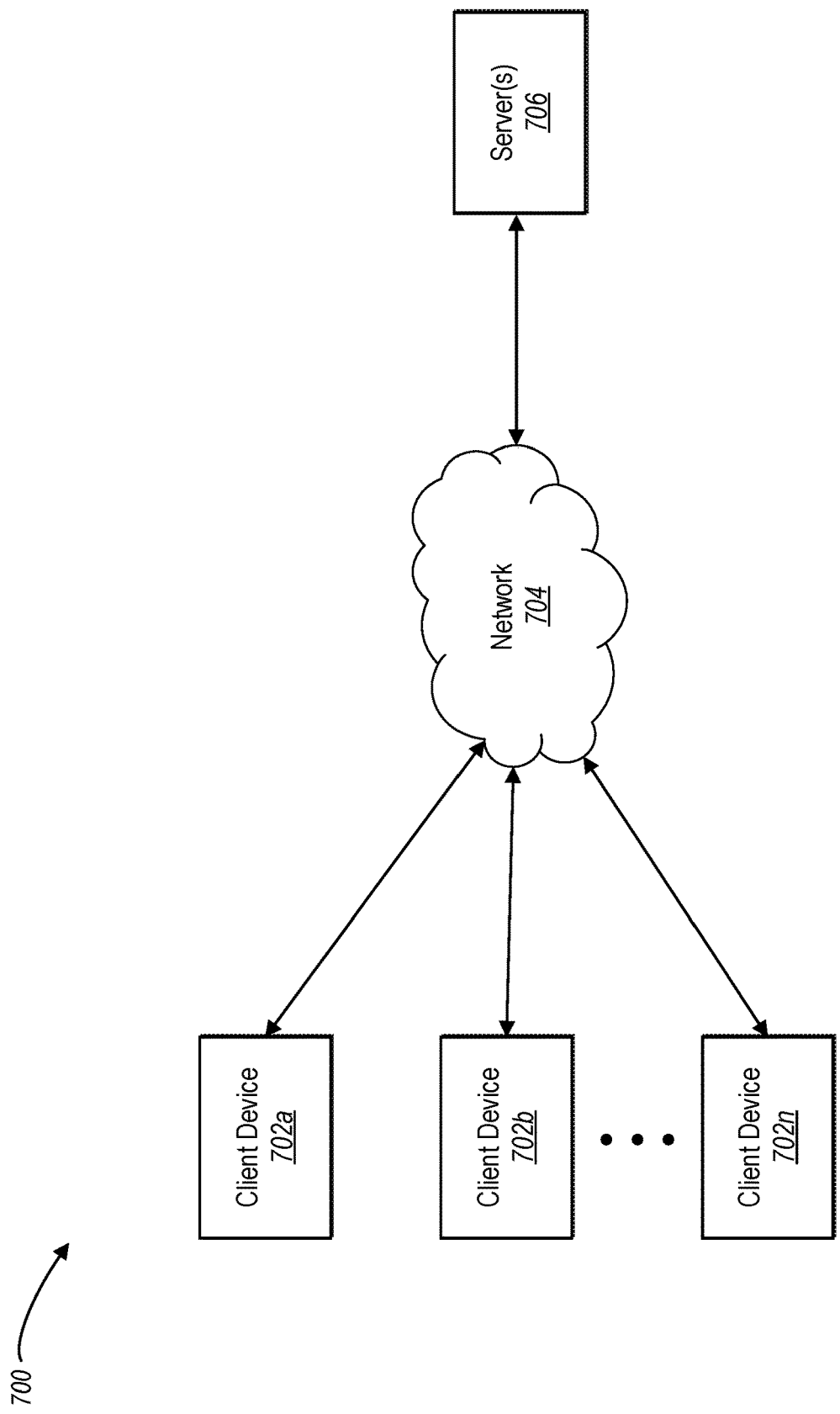
FIG. 7 illustrates a schematic diagram of an exemplary environment in which the digital font classification system can operate in accordance with one or more embodiments.

FIG. 7 illustrates a schematic diagram of one embodiment of an exemplary environment 700 in which the digital font classification system 600 can operate. In one or more embodiments, the exemplary environment 700 includes one or more client devices 702a, 702b, . . . 702n, a network 704, and server(s) 706. The network 704 may be any suitable network over which the computing devices can communicate. Example networks are discussed in more detail below with regard to FIG. 11.

As illustrated in FIG. 7, the environment 700 may include client devices 702a-702n. The client devices 702a-702n may comprise any computing device. For example, client devices 702a-702n may comprise one or more personal computers, laptop computers, mobile devices, mobile phones, tablets, special purpose computers, televisions, or other computing devices, including computing devices described below with regard to FIG. 11. For instance, in one or more embodiments, one or more of the client devices 702a-702n comprise the client device 602 implementing the digital font classification system 600.

In addition, the environment 700 may also include the server(s) 706. The server(s) 706 may generate, store, receive, and transmit any type of data, including the training digital font repository 628 or the digital fonts 630. For example, the server(s) 706 may transmit data to a client device, such as the client device 702a. The server(s) 706 can also transmit electronic messages between one or more users of the environment 700. In one example embodiment, the server(s) 706 comprise a content server. The server(s) 706 can also comprise a communication server or a web-hosting server. Additional details regarding the server(s) 706 will be discussed below with respect to FIG. 11.

As illustrated, in one or more embodiments, the server(s) 706 can include the digital font classification system 600. In particular, the digital font classification system 600 can comprise an application running on the server(s) 706 or a portion of a software application that can be downloaded from the server(s) 706. For example, the digital font classification system 600 can include a web hosting application that allows the client devices 702a-702n to interact with content hosted at the server(s) 706. To illustrate, in one or more embodiments of the exemplary environment 700, one or more client devices 702a-702n can access a webpage supported by the server(s) 706. In particular, the client device 702a can run a web application (e.g., a web browser) to allow a user to access, view, and/or interact with a webpage or website hosted at the server(s) 706.

Although FIG. 7 illustrates a particular arrangement of the client devices 702a-702n, the network 704, and the server(s) 706, various additional arrangements are possible. For example, while FIG. 7 illustrates multiple separate client devices 702a-702n communicating with the server(s) 706 via the network 704, in one or more embodiments a single client device may communicate directly with the server(s) 706, bypassing the network 704.

Similarly, although the environment 700 of FIG. 7 is depicted as having various components, the environment 700 may have additional or alternative components. For example, the digital font classification system 600 can be implemented on a single computing device. In particular, the digital font classification system 600 may be implemented in whole by the client device 702a (e.g., the client device 702a may comprise the client device 602) or the digital font classification system 600 may be implemented in whole by the server(s) 706. Alternatively, the digital font classification system 600 may be implemented across multiple devices or components (e.g., utilizing the client devices 702a-702n and the server(s) 706, as illustrated with regard to FIG. 4).

By way of example, in one or more embodiments, the client device 702a executes or launches an electronic document application (e.g., the electronic document application 610) and utilizes the electronic document application to generate an electronic document comprising digital text with a first digital font. Upon application of the electronic document application, the client device 702a can search the client device 702a (e.g., via the font detector 612) and identify a new digital font on the client device 702a. The client device 702a can automatically identify one or more font classifications corresponding to the new digital font (e.g., via the font classifier 614) and provide the one or more font classifications for utilization via a user interface associated with the electronic document application (e.g., modify the font feature database 632 such that the new digital font is available for utilization by the user interface manager 608). The client device 702a can receive user input (e.g., via the user input detector 606 and the user interface manager 608) of a search query comprising font characteristics. The client device 702a can search for and identify digital fonts satisfying the search query (e.g., via the search engine 616), including the new digital font, and provide visual representations of the identified digital fonts for display. The client device 702a can also receive user input of a selection of one of the identified digital fonts and apply the selected digital font to digital text in the electronic document.

As described previously, in one or more embodiments, the client device 702*a* classifies one or more digital fonts in conjunction with the server(s) 706. For example, the client device 702*a* can send a new digital font to the server(s) 706, the server(s) 706 can classify the new digital font (e.g., via the machine learning application engine 622), and send the new digital font to the client device 702*a*.

The server(s) 706 can also receive, collect, and manage new digital fonts with regard to a plurality of client devices. For example, in one or more embodiments, the server(s) 706 receive and manage new digital fonts from the client device 702*a* (and other client devices). The server(s) 706 can store the new digital fonts, search the new digital fonts, and provide the new digital fonts (e.g., to the client device 702*b*). In this manner, the server(s) 706 can facilitate in providing a new digital font to a particular user across multiple devices.

For example, a new digital font created on the client device 702*a* (i.e., a personal computer of the user) can be shared to the client device 702*b* (i.e., a mobile device owned by the same user). Thus, the digital font classification system 600 can automatically synchronize a new digital font across multiple devices corresponding to a user.

Similarly, a new digital font can be shared to multiple different users across multiple different devices. For instance, a new digital font created by a user of the client device 702*a* can be shared with another user of the client device 702*b*. Specifically, the client device 702*b* can send the server(s) 706 a request for a digital font (e.g., a search query), the server(s) 706 can identify the new digital font, and the server(s) 706 can provide the new digital font to the client device 702*b*. Thus, the digital font classification system 600 can enable sharing or distribution of new digital fonts to a plurality of computing devices.

Figure 8:
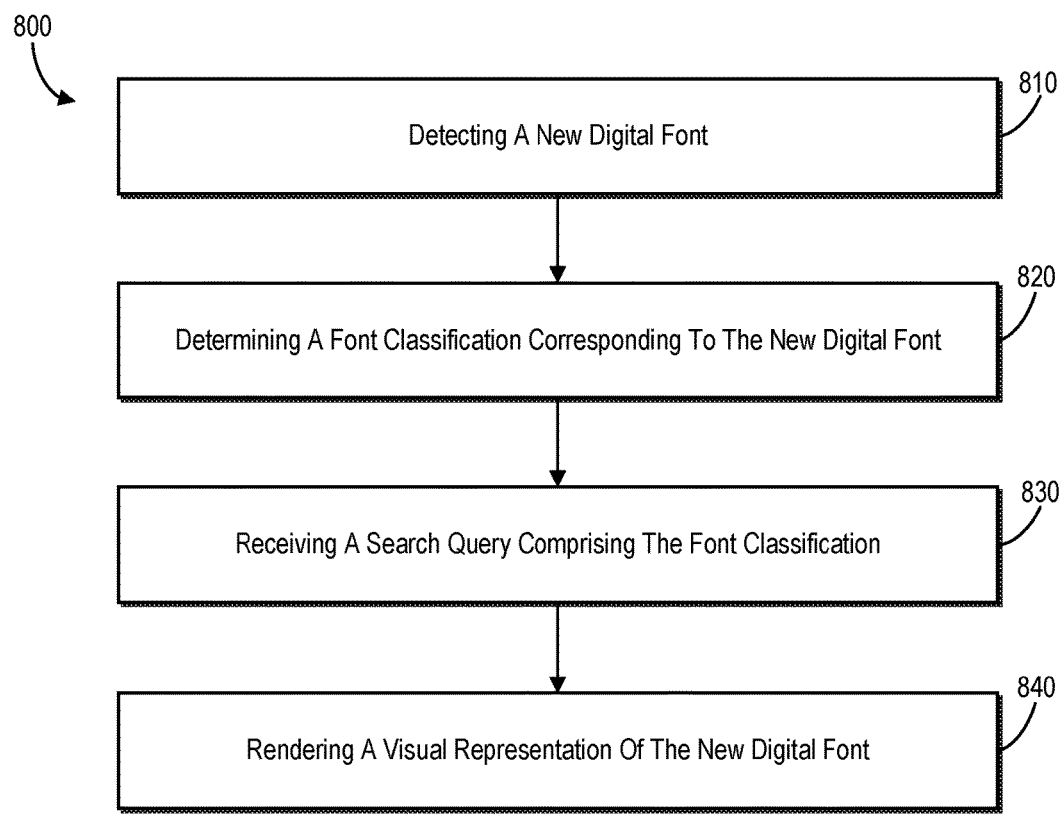
FIG. 8 illustrates a flowchart of a series of acts in a method of classifying and presenting a digital font in accordance with one or more embodiments.
Figure 9:
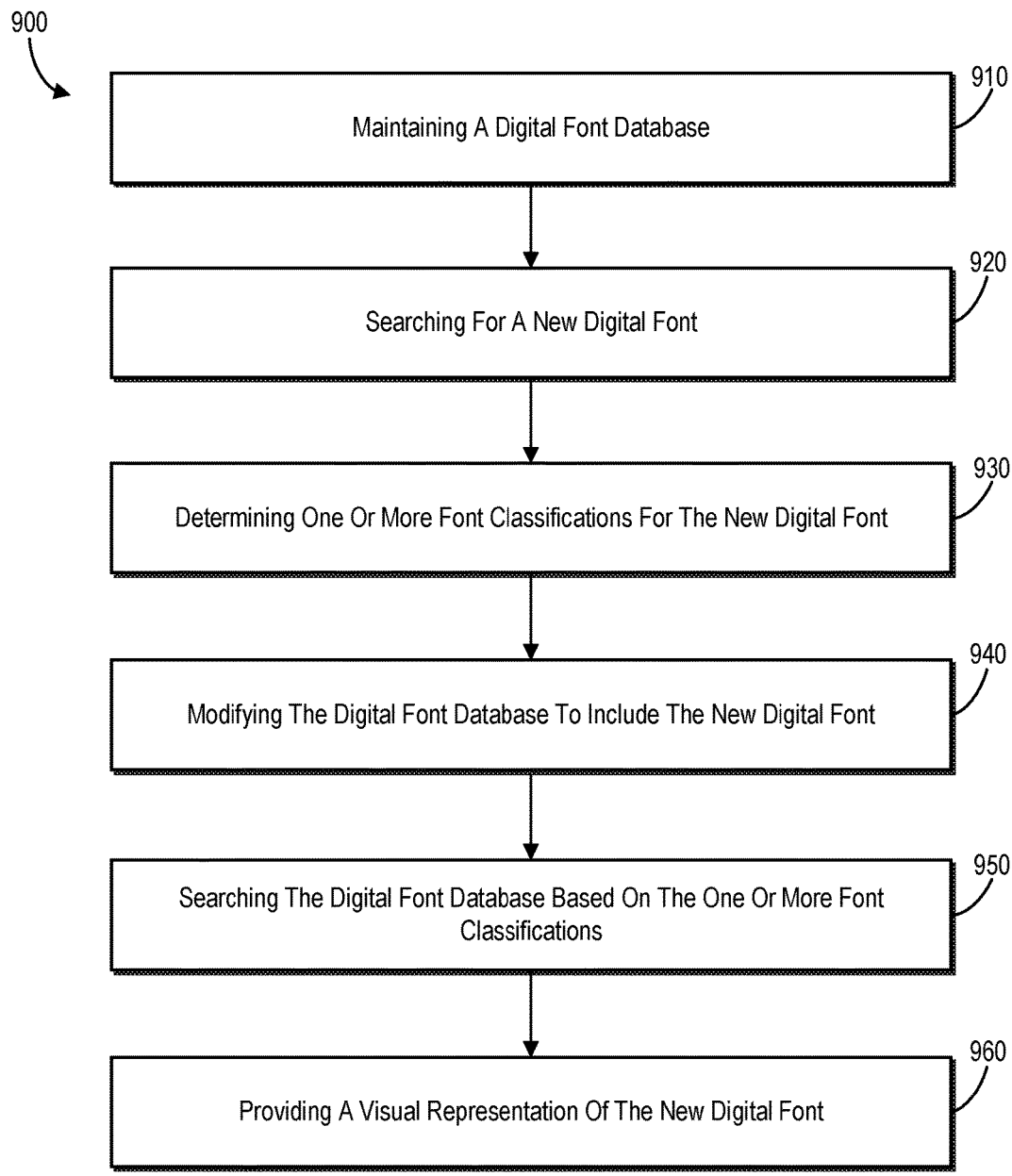
FIG. 9 illustrates another flowchart of a series of acts in a method of classifying and presenting a digital font in accordance with one or more embodiments.
Figure 10:
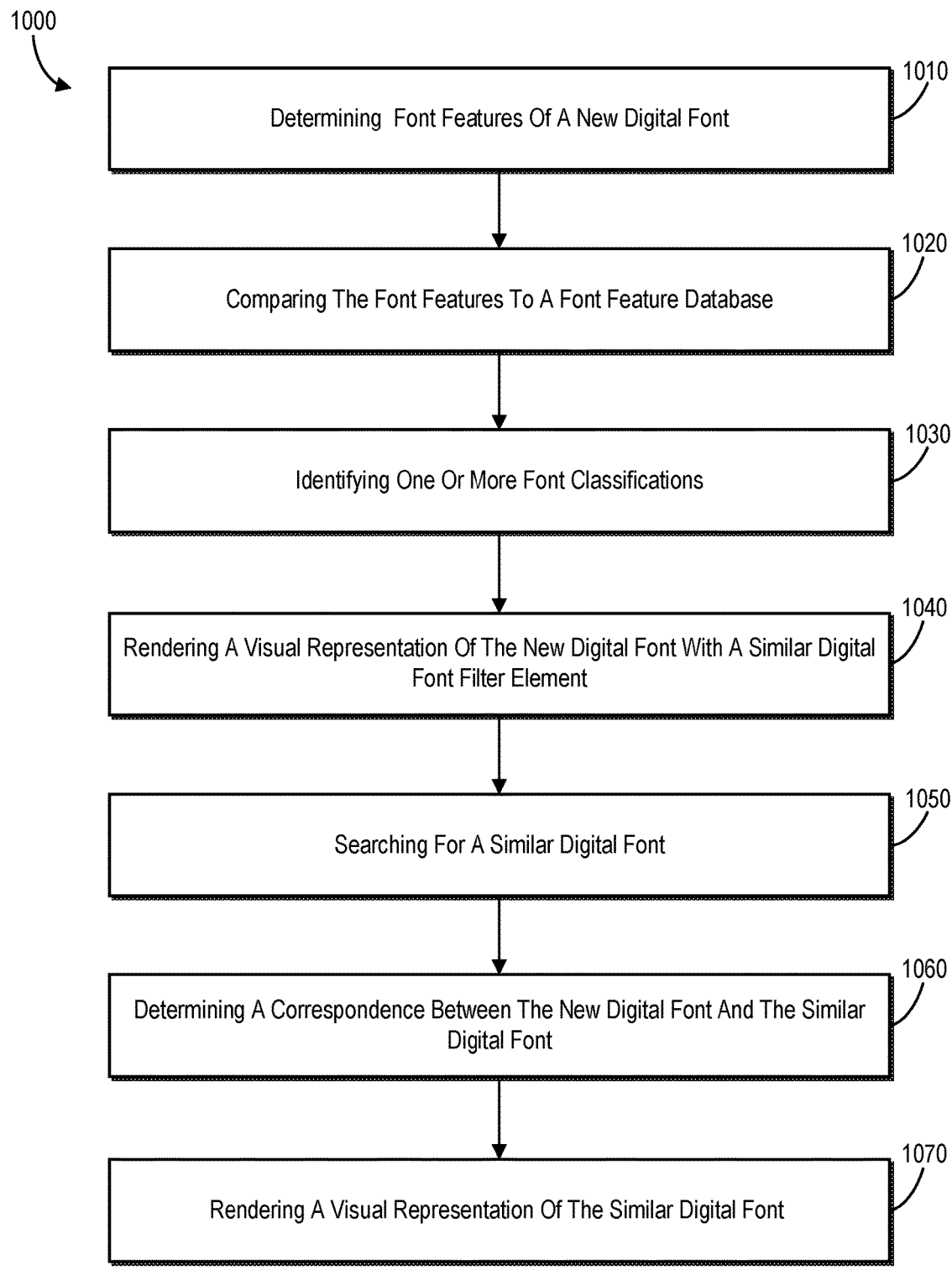
FIG. 10 illustrates another flowchart of a series of acts in a method of classifying and presenting a digital font in accordance with one or more embodiments.

FIGS. 1A-7, the corresponding text, and the examples, provide a number of different systems and devices that classify and provide digital fonts. In addition to the foregoing, embodiments can also be described in terms of flowcharts comprising acts and steps in a method for accomplishing a particular result. For example, FIGS. 8-10 illustrate flowcharts of exemplary methods in accordance with one or more embodiments. The methods described in relation to FIGS. 8-10 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of classifying digital fonts in accordance with one or more embodiments. In one or more embodiments, the method 800 is performed in a digital medium environment that includes the digital font classification system 600. The method 800 is intended to be illustrative of one or more methods in accordance with the present disclosure, and is not intended to limit potential embodiments. Alternative embodiments can include additional, fewer, or different steps than those articulated in FIG. 8.

As illustrated in FIG. 8 the method 800 includes an act 810 of detecting a new digital font. In particular, the act 810 can include upon running an electronic document application on a computing device, detecting a new digital font on the computing device. For example, in one or more embodiments, detecting the new digital font on the computing device further comprises searching a repository of digital fonts on the computing device for the new digital font As shown in FIG. 8, the method 800 also includes an act 820 of determining a font classification corresponding to the new digital font. In particular, the act 820 can include, in response to detecting the new digital font on the computing device, determining a font classification corresponding to the new digital font based on font features of the new digital font. For example, in one or more embodiments, the act 830 comprises detecting the font features of the new digital font; and comparing the font features of the new digital font with a plurality of font features of a font feature database, wherein the font feature database associates the plurality of font features with corresponding font classifications and wherein the font feature database is generated utilizing a machine learning algorithm trained utilizing training digital fonts and training font classifications.

As illustrated in FIG. 8, the method 800 also includes an act 830 of receiving a search query comprising the font classification. In particular, the act 830 can include receiving user input of a search query via a user interface of the electronic document application, the search query comprising the font classification. For example, in one or more embodiments, the act 830 comprises receiving selection of search query parameters via a selectable filter element of the user interface.

In addition, as shown in FIG. 8, the method 800 also includes an act 840 of rendering a visual representation of the new digital font. In particular, the act 840 can include rendering, within the user interface of the electronic document application, a visual representation of the new digital font for selection and application to digital text.

In one or more embodiments, the act 840 also includes rendering a similar digital font filter element in conjunction with the visual representation of the new digital font. Moreover, the method 800 can also include detecting user selection of the similar digital font filter element; in response to the selection of the similar digital font filter element, comparing a feature vector corresponding to the new digital font and a feature vector of a similar digital font; determining a correspondence between the new digital font and the similar digital font based on the comparison; and rendering a visual representation of the additional digital font similar to the new digital font.

In addition, in one or more embodiments, the method 800 also includes receiving a selection of the visual representation of the new digital font; and applying the new digital font to digital text via the electronic document application in response to the selection of the visual representation of the new digital font.

Furthermore, in one or more embodiments, the method 800 also includes rendering a font attribute selectable menu option together with the similar digital font filter element; in response to user interaction with the font attribute selectable menu option, providing visual representations of a plurality of font attributes, wherein the visual representations of the plurality of font attributes comprise a plurality of descriptive terms; upon selection of at least one of the font attributes from the plurality of font attributes, identifying additional digital fonts from the plurality of digital fonts and the new digital font that correspond to the selected attribute; and providing a visual representation of the additional digital fonts for display In addition, FIG. 9 illustrates another flowchart of a series of acts in a method 900 of suggesting digital fonts in accordance with one or more embodiments. As shown, the method 900 can include an act 910 of maintaining a digital font database. In particular, the act 910 can include maintaining a digital font database associating a plurality of digital fonts with corresponding font classifications.

As shown in FIG. 9, the method 900 also includes an act 920 of searching for a new digital font. In particular, the act 920 can include, in response to executing an electronic document application, searching a repository of digital fonts for a new digital font that is not one of the plurality of digital fonts in the font feature database.

As illustrated in FIG. 9, the method 900 also includes an act 930 of determining one or more font classifications for the new digital font. In particular, the act 930 can include, upon identifying the new digital font in the repository of digital fonts, determining one or more font classifications for the new digital font based on one or more font features of the new digital font. For example, in one or more embodiments, the one or more font classifications comprise at least one of: a font class, a weight, a width, an x-height, a contrast, or a capitalization style.

In addition, as shown in FIG. 9, the method 900 also includes an act 940 of modifying the digital font database to include the new digital font. In particular, the act 940 can include modifying the digital font database associating the plurality of digital fonts with corresponding font classifications to include the new digital font and an association with the one or more font classifications.

Furthermore, as illustrated in FIG. 9, the method 900 also includes an act 950 of searching the digital font database based on the one or more font classifications. In particular, the act 950 can include searching the digital font database for digital fonts associated with the one or more font classifications.

Moreover, as shown in FIG. 9, the method 900 also includes an act 960 of providing a visual representation of the new digital font. In particular, the act 960 can include providing, in a user interface of the document application, a visual representation of the new digital font together with visual representations of digital fonts from the plurality of digital fonts associated with the one or more font classifications.

In one or more embodiments, the method 900 also includes automatically determining the one or more font classifications corresponding to the new digital font and modifying the digital font database without any additional user input after executing the electronic document application.

In addition, FIG. 10 illustrates another flowchart of a series of acts in a method 1000 of classifying digital fonts in accordance with one or more embodiments. As shown, the method 1000 includes an act 1010 of determining font features of a new digital font. In particular, the act 1010 can include determining font features of a new digital font installed on a computing device.

As shown in FIG. 10, the method 1000 also includes an act 1020 of comparing the font features to a font feature database. In particular, the act 1020 can include comparing the font features of the new digital font to a font feature database, wherein the font feature database comprises a plurality of font features and corresponding font classifications generated based on a machine learning algorithm trained from a plurality of training digital fonts and training font classifications.

As illustrated in FIG. 10, the method 1000 also includes an act 1030 of identifying one or more font classifications. In particular, the act 1030 can include identifying one or more font classifications corresponding to the new digital font based on the comparison of the font features of the new digital font to the font feature database.

Moreover, as shown in FIG. 10, the method 1000 also includes an act 1040 of rendering a visual representation of the new digital font with a similar digital font filter element. In particular, the act 1040 can include rendering a visual representation of the new digital font together with a similar digital font filter element.

In addition, as illustrated in FIG. 10, the method 1000 also includes an act 1050 of searching for a similar digital font. In particular, the act 1050 can include, in response to selection of the similar digital font filter element, searching for a similar digital font by comparing a feature vector corresponding to the new digital font and a feature vector of a similar digital font.

Furthermore, as shown in FIG. 10, the method 1000 also includes an act 1060 of determining a correspondence between the new digital font and the similar digital font. In particular, the act 1060 can include determining a correspondence between the new digital font and the similar digital font based on the comparison.

As illustrated in FIG. 10, the method 1000 also includes an act 1070 of rendering a visual representation of the similar digital font. In particular, the act 1070 can include rendering an attribute selectable menu option together with the similar digital font filter element; in response to user interaction with the attribute selectable menu option, providing visual representations of a plurality of attributes, wherein the visual representations of the plurality of attributes comprise a plurality of descriptive terms; upon selection of at least one of the attributes from the plurality of attributes, identifying additional digital fonts from the plurality of digital fonts and the new digital font that correspond to the selected attribute; and providing a visual representation of the additional digital fonts for display.

In one or more embodiments, the method 1000 also comprises determining the font features of the new digital font, comparing the font features of the new digital font to the font feature database, and identifying the one or more font classifications without user input of a digital font, font features, or font characteristics.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
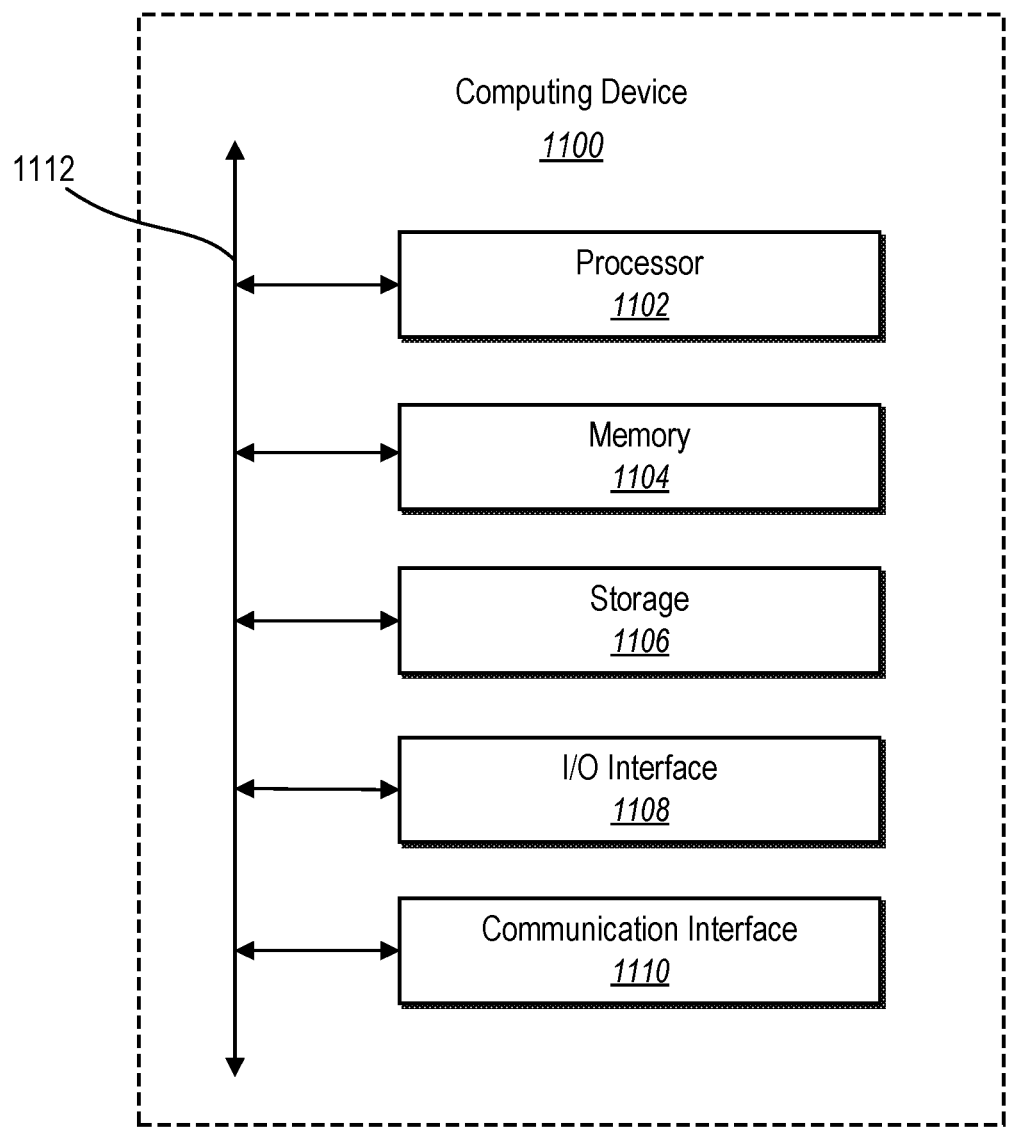
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the digital font classification system 600. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), flash memory, a Universal Serial Bus (USB) drive or a combination these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for creating or editing digital documents, a method of classifying and presenting electronic fonts, comprising:

detecting, by a processor, a new digital font on a computing device;

generating, by the processor and a classification neural network, one or more neural network feature vectors corresponding to the new digital font based on font features of the new digital font;

determining, utilizing the classification neural network, a plurality of font classifications based on the one or more neural network feature vectors, the plurality of font classifications comprising a font attribute and a font class;

providing for display, a user interface of an electronic document application on the computing device, wherein the user interface comprises text rendered utilizing an existing font and selectable font search elements, the selectable font search elements comprising a similar digital font filter element; and in response to receiving user input of a search query via the similar digital font filter element of the user interface of the electronic document application:

identifying a similar digital font based on a distance between the one or more neural network feature vectors determined utilizing the classification neural network and an additional neural network feature vector corresponding to the existing font; and rendering, by the processor and within a list of fonts of the user interface of the electronic document application, a visual representation of the similar digital font and two or more digital fonts for selection and application to digital text.

2. The method of claim 1, wherein the selectable font search elements further comprise a font attribute selectable element, a font class selectable element, a server font filter selectable element, and a favorites font selectable element.

3. The method of claim 2, wherein the similar digital font consists of the new digital font.

4. The method of claim 2, further comprising receiving a second user input, via the font class selectable element, of one or more font classes from a set of font classes, the set of font classes comprising serif, sans serif, and slab serif; and conducting a search based on the one or more font classes.

5. The method of claim 2, further comprising generating the additional neural network feature vector corresponding to the existing font utilizing the classification neural network.

6. The method of claim 1, wherein the classification neural network comprises a convolutional neural network trained to generate one or more font classifications based on training fonts and training font classifications.

7. The method of claim 2, further comprising:

receiving a second user input via the favorites font selectable element; and in response to the second user input, rendering a plurality of fonts based on previous user interaction with the plurality of fonts.

8. The method of claim 2, further comprising:

in response to receiving a second user input via the font attribute selectable element, providing visual representations of a plurality of font attributes, wherein the visual representations of the plurality of font attributes comprise descriptive terms;

upon selection of the font attribute from the plurality of font attributes, identifying additional digital fonts from a plurality of digital fonts on the computing device and the new digital font that correspond to the font attribute; and providing a visual representation of the additional digital fonts for display in the list of fonts.

9. A system that allows computing devices to classify and present electronic fonts comprising:
at least one processor; and
at least one non-transitory computer readable storage medium storing instructions that, when executed by the at least one processor, cause the system to:
search a repository of digital fonts for a new digital font;
upon identifying the new digital font in the repository of digital fonts, utilize a classification neural network to determine one or more neural network feature vectors corresponding to the new digital font based on one or more font features of the new digital font;
determine, utilizing the classification neural network, font classifications for the new digital font based on the one or more neural network feature vectors;
provide in a user interface of an electronic document application a list of fonts, text rendered utilizing an existing font and selectable font search elements, the selectable font search elements comprising a similar digital font filter element;
in response to on user selection of the similar digital font filter element of the user interface:
identify a similar digital font based on a distance between the one or more neural network feature vectors determined utilizing the classification neural network and an additional neural network feature vector corresponding to the existing font; and
provide in the user interface of the electronic document application a visual representation of the similar digital font and two or more digital fonts.

10. The system of claim 9, wherein the selectable font search elements further comprise a font attribute selectable element, a font class selectable element, a server font filter selectable element, and a favorites font selectable element.

11. The system of claim 10, further comprising instructions that, when executed by the at least one processor, cause the system to:
receive a second user input comprising user interaction via the server font filter selectable element; and
render a set of fonts available via a remote server.

12. The system of claim 9, wherein the classification neural network comprises a convolutional neural network trained to generate one or more font classifications based on training fonts and training font classifications.

13. The system of claim 9, further comprising instructions that, when executed by the at least one processor, cause the system to generate the additional neural network feature vector corresponding to the existing font utilizing the classification neural network.

14. The system of claim 9, further comprising instructions that, when executed by the at least one processor, cause the system to:
detect a plurality of new digital fonts;
rank the plurality of new digital fonts into a priority order based on whether each of the plurality of new digital fonts was created on a client device; and
determine a plurality of font classifications corresponding to each of the new digital fonts by analyzing each new digital font according to the priority order.

15. The system of claim 14, further comprising instructions that, when executed by the at least one processor, cause the system to rank the plurality of new digital fonts into the priority order based on file size of each of the plurality of new digital fonts.

16. The system of claim 10, further comprising instructions that, when executed by the at least one processor, cause the system to:
in response to user interaction with the font attribute selectable element, provide visual representations of a plurality of font attributes with the list of fonts, wherein the visual representations of the plurality of font attributes comprise a plurality of descriptive terms, wherein the descriptive terms comprise at least one of: angular, artistic, attention-grabbing, attractive, boring, calm, charming, clumsy, complex, delicate, disorderly, dramatic, formal, fresh, friendly, gentle, graceful, happy, modern, playful, pretentious, or sloppy;
upon selection of at least one font attribute of the font attributes from the plurality of font attributes, identify additional digital fonts that correspond to the at least one font attribute; and
provide a visual representation of the additional digital fonts for display.

17. A non-transitory computer readable medium storing instructions thereon that, when executed by at least one processor, cause a computer system to:
utilize a classification neural network to generate one or more neural network feature vectors corresponding to a new digital font based on font features of the new digital font;
determine, utilizing the classification neural network, font classifications based on the one or more neural network feature vectors;
provide for display a user interface in an electronic document application, wherein the user interface comprises text rendered utilizing an existing font and selectable font search elements, the selectable font search elements comprising a similar digital font filter element;
in response to receiving user input of a search query via the similar digital font filter element:
identify a similar digital font based on a distance between the one or more neural network feature vectors determined utilizing the classification neural network and an additional neural network feature vector corresponding to the existing font; and
rendering, within the user interface of the electronic document application, a visual representation of the similar digital font and two or more digital fonts for selection and application to digital text.

18. The non-transitory computer readable medium of claim 17, further comprising instructions that, when executed by the at least one processor, cause the computer system to generate the additional neural network feature vector corresponding to the existing font utilizing the classification neural network.

19. The non-transitory computer readable medium of claim 17, wherein the similar digital font consists of the new digital font.

20. The non-transitory computer readable medium of claim 17, wherein the classification neural network comprises a convolutional neural network trained to generate one or more font classifications based on training fonts and training font classifications.

* * * * *